United States Patent
Niemasik et al.

(10) Patent No.: US 10,372,991 B1
(45) Date of Patent: Aug. 6, 2019

(54) SYSTEMS AND METHODS THAT LEVERAGE DEEP LEARNING TO SELECTIVELY STORE AUDIOVISUAL CONTENT

(71) Applicant: Google LLC, Mountain View, CA (US)

(72) Inventors: James Niemasik, San Francisco, CA (US); Manoj Plakal, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/944,415

(22) Filed: Apr. 3, 2018

(51) Int. Cl.
| | |
|---|---|
| H04N 5/93 | (2006.01) |
| G06K 9/00 | (2006.01) |
| G10L 25/57 | (2013.01) |
| G06N 3/04 | (2006.01) |
| G10L 25/30 | (2013.01) |

(52) U.S. Cl.
CPC ..... *G06K 9/00718* (2013.01); *G06K 9/00288* (2013.01); *G06K 9/00744* (2013.01); *G06N 3/0454* (2013.01); *G10L 25/30* (2013.01); *G10L 25/57* (2013.01); *G06K 2009/00738* (2013.01)

(58) Field of Classification Search
CPC ...... H04N 5/772; H04N 5/77; H04N 5/23238; H04N 5/23232; H04N 5/272
USPC ................ 386/241, 239, 278, 281, 285, 290
See application file for complete search history.

(56) References Cited

U.S. PATENT DOCUMENTS

| | | |
|---|---|---|
| 6,925,455 B2 | 8/2005 | Gong et al. |
| 9,836,484 B1 | 12/2017 | Bialynicka-Birula et al. |
| 2007/0124292 A1 | 5/2007 | Kirshenbaum et al. |
| 2008/0193016 A1 | 8/2008 | Lim et al. |
| 2011/0047163 A1* | 2/2011 | Chechik .............. G06F 16/7867 707/741 |
| 2014/0362290 A1 | 12/2014 | Bridges et al. |
| 2015/0086091 A1* | 3/2015 | Rezaee ................ G06K 9/6224 382/128 |
| 2016/0127641 A1 | 5/2016 | Gove |
| 2016/0365114 A1 | 12/2016 | Galant et al. |

(Continued)

OTHER PUBLICATIONS

Bertero et al., "Deep Learning of Audio and Language Features for Humor Prediction", International Conference on Language Resources and Evaluation, Portoroz, Slovenia, May 23-28, 2016, pp. 496-501.

(Continued)

*Primary Examiner* — Robert Chevalier
(74) *Attorney, Agent, or Firm* — Dority & Manning, P.A.

(57) ABSTRACT

Systems, methods, and devices for curating audiovisual content are provided. A mobile image capture device can be operable to capture one or more images; receive an audio signal; analyze at least a portion of the audio signal with a first machine-learned model to determine a first audio classifier label descriptive of an audio event; identify a first image associated with the first audio classifier label; analyze the first image with a second machine-learned model to determine a desirability of a scene depicted by the first image; and determine, based at least in part on the desirability of the scene depicted by the first image, whether to store a copy of the first image associated with the first audio classifier label in the non-volatile memory of the mobile image capture device or to discard the first image without storing a copy of the first image.

20 Claims, 18 Drawing Sheets

(56) References Cited

U.S. PATENT DOCUMENTS

2017/0161638 A1* 6/2017 Garagic ............... G06N 7/005
2017/0278525 A1   9/2017 Wang et al.

OTHER PUBLICATIONS

Cakir et al., "Polyphonic Sound Event Detection Using Multi Label Deep Neural Networks", International Joint Conference on Neural Networks, Killarney, Ireland, Jul. 12-17, 2015, 8 pages.
Kumar et al., "Audio Event Detection Using Weakly Labeled Data", arXiv:1605.02401v3, Jul. 6, 2016, 10 pages.
Invitation to Pay Additional Fees for Application No. PCT/US2019/01839, dated Apr. 18, 2019, 10 pages.

* cited by examiner

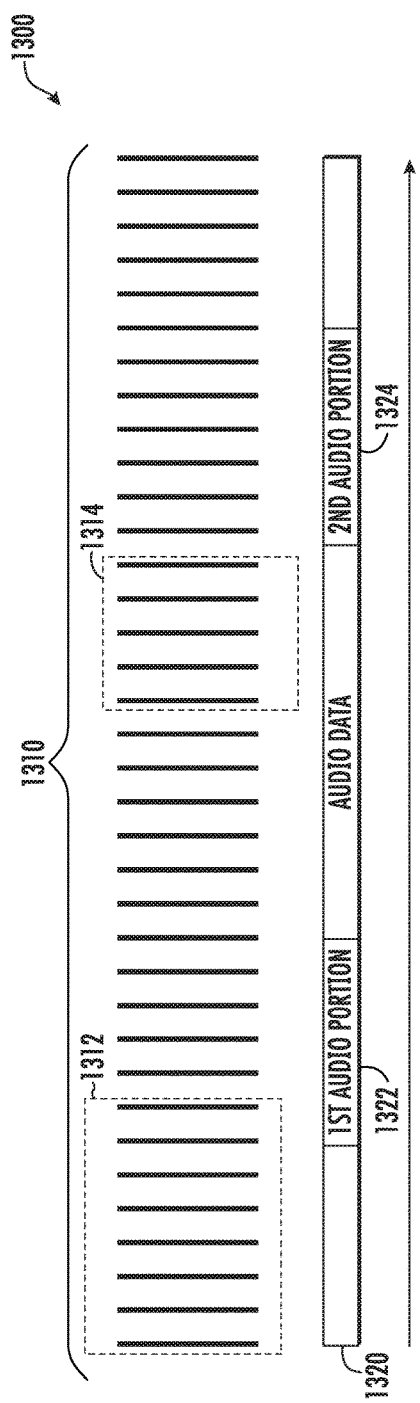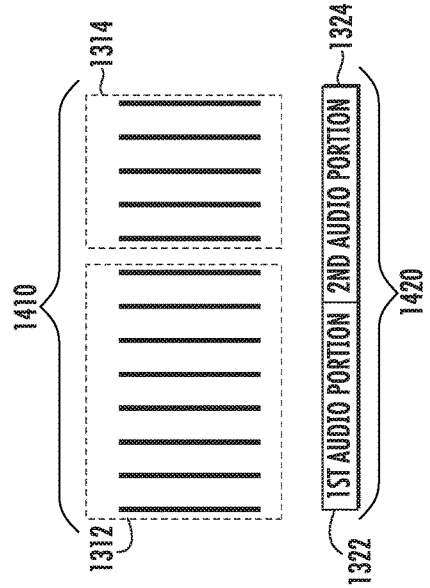

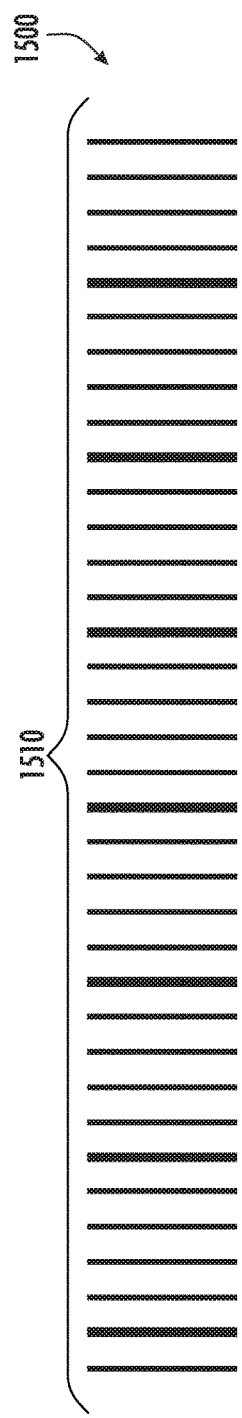
FIG. 15
FIG. 16

SYSTEMS AND METHODS THAT LEVERAGE DEEP LEARNING TO SELECTIVELY STORE AUDIOVISUAL CONTENT

FIELD

The present disclosure relates generally to an audiovisual content capture, curation, and editing system that includes an image capture device that intelligently captures audiovisual content. More particularly, the present disclosure relates to systems and methods that leverage machine-learning to selectively store images and generate edited video at an image capture device.

BACKGROUND

An image capture device can capture audiovisual content from various perspectives, which may be useful for various objectives. As one example application, an image capture device can be used to perform life logging, in which images, image streams, and in some implementations, associated audio, are captured by the image capture device over a period of time to document various events that occur during the user's daily life. Life logging can be performed to assist in memory retention in the elderly, to share the user's perspective or experience with other persons, or to simply document the various events that the user experiences so that the user can revisit such events in the future and enjoy their recollection. For example, a parent may enjoy reviewing images of their child blowing out candles on a birthday cake.

Thus, an image capture device can be used to capture particular events in a person's life in much the same manner as the person would use a traditional camera to record such events. However, an image capture device may provide the further benefit that the user does not have to actively operate a camera during the event to capture the event. Instead, the user is able to fully engage in and enjoy the event while the image capture device captures imagery, and in some cases, audio of the event. For example, the parent can enjoy and participate in their child blowing out candles on the birthday cake without the distraction of operating a camera, while still obtaining imagery of the scene to enjoy at a later time.

Furthermore, an image capture device may be relatively more adept at capturing and curating audiovisual content, such as imagery of candid moments, versus a traditional camera. In particular, people commonly pose or otherwise unnaturally change their expression when a camera is used to take a photograph. In this sense, an image capture device may be able to capture images which more accurately reflect true user experiences, such as laughter during conversation or a genuine but fleeting smile, while traditional cameras are more limited to the images in which the subjects adopt a common pose or "say cheese".

However, a primary challenge faced by the design and use of image capture devices is the resource-limited environment in which they operate. In particular, the design and use of image capture devices is typically subject to the following constraints: a limited amount of memory to be used for image storage over a significant period of time; a limited amount of processing power or capability to continuously process imagery; a limited amount of energy available to operate over an extended period of time; and/or a limited amount of thermal power that can be dissipated (i.e., a device temperature that should not be exceeded so as to prevent overheating of the device or discomfort for the user, who may in some instances wear the mobile image capture device).

Moreover, performing analysis of audiovisual content captured by an image capture device, such as analyzing a continuous image stream, can be resource intensive. For example, despite advances in the size and ability of image processing chips, image capture devices will still typically have a limited amount of computational power which can be employed at any given moment in time, and further, limited battery resources to power the analysis process. Additionally, the compression, storage, and transmission of audiovisual content, such as images and any associated audio, may be the portions of a typical processing cycle which consume the most significant amounts of power. For example, storing and transmitting full-length video files can quickly deplete an image capture device's battery reserves. Thus, the ability to identify image capture opportunities, intelligently select candidate images for analysis, and generate shortened, edited video files for less resource-intensive transmission in an efficient manner is desirable.

SUMMARY

Aspects and advantages of the present disclosure will be set forth in part in the following description, or may be obvious from the description, or may be learned through practice of embodiments of the present disclosure.

One example aspect of the present disclosure is directed to a mobile image capture device. The mobile image capture device can include a network interface, a power source, an image sensor, an audio sensor, at least one processor, and a memory that stores a plurality of machine-learned models. The plurality of machine-learned models can include a first machine-learned model configured to determine an audio classifier label and a second machine-learned model configured to determine a desirability of a scene depicted by an image. The memory comprising at least a temporary image buffer, an audio buffer, and a non-volatile memory. The mobile image capture device can be operable to receive an audio signal. The mobile image capture device can be further operable to analyze at least a portion of the audio signal with the first machine-learned model to determine a first audio classifier label descriptive of an audio event. Responsive to determining the first audio classifier label descriptive of the audio event, the mobile image capture device can be further operable to identify a first image associated with the first audio classifier label descriptive of the audio event. The mobile image capture device can be further operable to analyze the first image with the second machine-learned model to determine a desirability of a scene depicted by the first image. The mobile image capture device can be further operable to determine, based at least in part on the desirability of the scene depicted by the first image, whether to store a copy of the first image associated with the first audio classifier label in the non-volatile memory of the mobile image capture device or to discard the first image without storing a copy of the first image. The first image can be an image captured by the mobile image capture device.

Another example aspect of the present disclosure is directed to a method to generate an edited video including an ambient soundtrack. The method can include obtaining, by one or more computing devices, data indicative of a video stream comprising a plurality of sequential image frames and an associated audio signal. The method can further include analyzing, by the one or more computing devices, the audio signal with a machine-learned audio classifier model to determine a plurality of audio classifier labels associated with a plurality of portions of the audio signal. The method can further include generating, by the one or more computing devices, an ambient soundtrack comprising at least a first portion of the audio signal based at least in part on the plurality of audio classifier labels. Generating the ambient soundtrack based at least in part on the plurality of audio classifier labels can include selecting for inclusion in the ambient soundtrack portions of the audio signal that have audio classifier labels associated with ambient sound while rejecting portions of the audio signal that have audio classifier labels associated with foreground sound. The method can further include generating, by the one or more computing devices, an image stream comprising at least a subset of the plurality of sequential image frames. The method can further include generating, by the one or more computing devices, an edited video comprising the ambient soundtrack and the image stream.

Another example aspect of the present disclosure is directed to a method for capturing an image. The method can include capturing, by an image sensor of an image capture device, one or more images. The method can further include maintaining, by the image capture device, a copy of the one or more captured images in a temporary image buffer of the image capture device. The method can further include receiving, by the image capture device, an audio signal. The method can further include analyzing, by the image capture device, at least a portion of the audio signal with a machine-learned audio classifier model to determine a first audio classifier label descriptive of an audio event. Responsive to determining the first audio classifier label, the method can further include determining, by the image capture device, a time displacement amount associated with the first audio classifier label. The method can further include using, by the image capture device, the time displacement amount to identify a first captured image associated with the first audio classifier label from the one or more captured images maintained in the temporary image buffer. The first captured image can be temporally displaced from the portion of the audio signal labeled with the first audio classifier label by the time displacement amount. The method can further include storing, by the image capture device, a copy of the first captured image in a non-volatile memory of the image capture device.

Other aspects of the present disclosure are directed to various systems, apparatuses, non-transitory computer-readable media, user interfaces, and electronic devices.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which:

FIG. 13 depicts a visual representation of an example shortened video generation framework according to example aspects of the present disclosure;

FIG. 14 depicts a visual representation of an example shortened video generation framework according to example aspects of the present disclosure;

FIG. 15 depicts a visual representation of an example hyper-lapse video generation framework according to example aspects of the present disclosure;

FIG. 16 depicts a visual representation of an example hyper-lapse video generation framework according to example aspects of the present disclosure;

DETAILED DESCRIPTION

Figure 1:
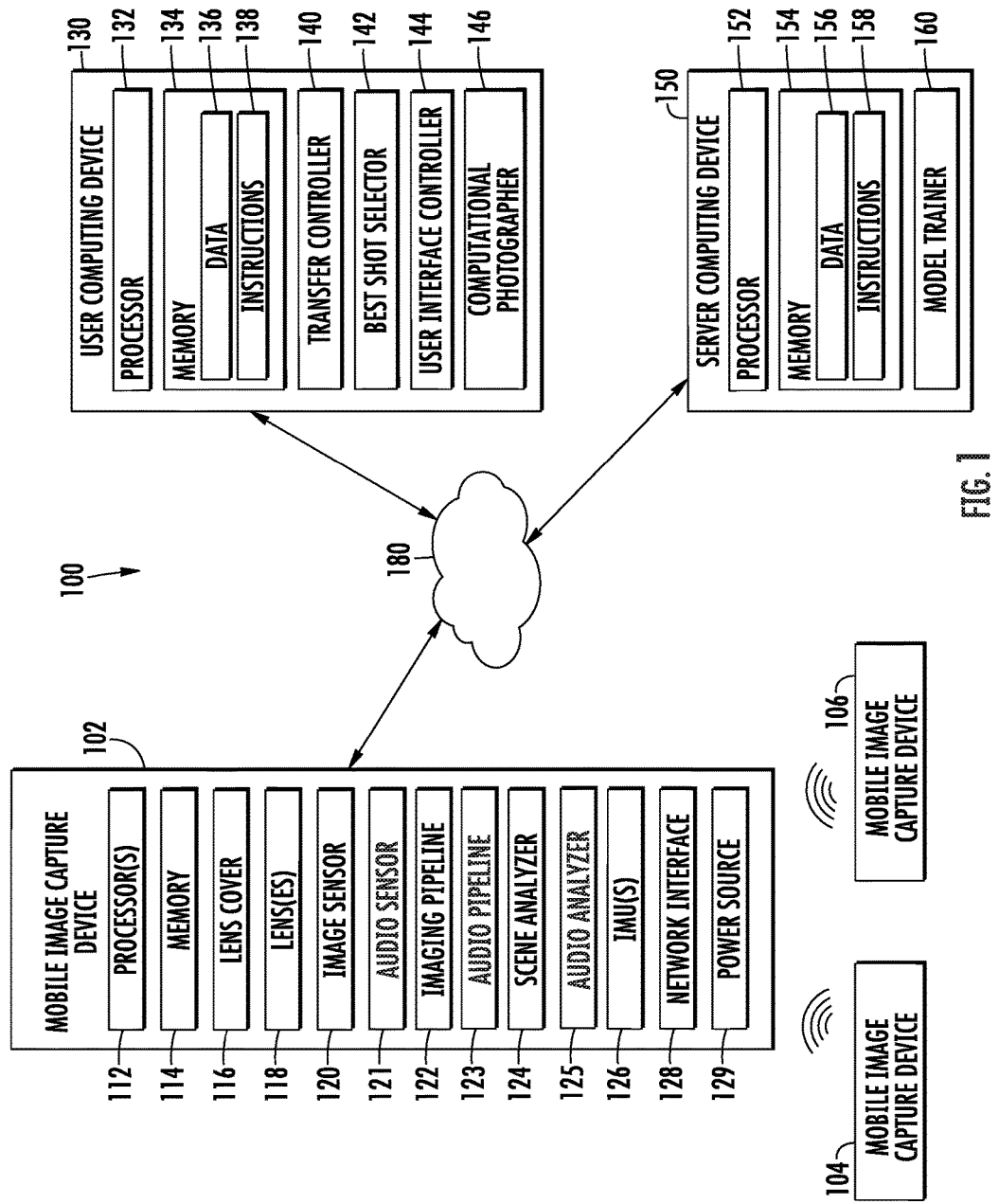
FIG. 1 depicts an example image capture, curation, and editing system according to example aspects of the present disclosure.

The present disclosure provides systems and methods for selective retention and editing of audiovisual content captured by an image capture device. In particular, an example system of the present disclosure can include an image capture device that is selectively communicatively connectable with a user computing device such as a smartphone, laptop, or tablet. When operative, the image capture device can continuously capture frames of imagery and/or associated audio and can selectively retain certain of such frames of imagery and/or audio. The user computing device can perform image curation, editing, storage, sharing, and other tasks. The system can be used for life logging or other immersive image capture experiences or objectives.

More particularly, according to an aspect of the present disclosure, the mobile image capture device includes on-device intelligence that assists in selecting only certain of the captured images and/or audio for compression and storage. As an example, the mobile image capture device can include an audio sensor (e.g., microphone) that can obtain an audio signal, such as data indicative of one or more audio events. The audio data (or a portion thereof) can be analyzed by an audio analyzer of the mobile image capture device to determine one or more audio classifier labels descriptive of the one or more audio events. The mobile image capture device can then select one or more images associated with the one or more audio classifier labels for image analysis. The mobile image capture device can further include a scene analyzer that analyzes a scene depicted by an image to assess a desirability of such scene and, based at least in part on such desirability, determines whether to store such image and/or one or more other images or to discard such image and/or other images without further storage. In some implementations, the scene analyzer includes one or more neural networks, such as deep neural networks or other multi-layer non-linear models which output descriptors of the desirability of the scene of an input image. As compression, storage, and transmission of images are the stages of the image processing cycle which require the largest energy expenditure, the selective retention of imagery as guided by the on-device intelligence drastically reduces the power consumption of the mobile image capture device and enables superior performance given limited energy resources (e.g., a battery) and device temperature constraints. Likewise, the selective retention of imagery and/or audio as guided by the on-device intelligence also drastically reduces the memory consumption of the mobile image capture device over time. Further, the use of audio as an input in an image capture and retention process can allow for the capture and retention of images which may not have been captured otherwise.

In some implementations, an audio sensor of the mobile image capture device, such as a microphone, can obtain an audio signal which can then be analyzed by the mobile image capture device, such as on a continuous or rolling basis. In some implementations, an audio signal processing pipeline can convert an analog audio signal into a digital signal, such as data indicative of the audio signal, by, for example, one or more analog to digital converters. In some implementations, the data indicative of the audio signal can be temporarily maintained in an audio buffer during analysis, and can be discarded following analysis.

The data indicative of the audio signal can be analyzed by a machine-learned model, such as an audio analyzer neural network of the mobile image capture device. In some implementations, other types of machine-learned models can be used. For example, in some implementations, data indicative of the audio signal, or a portion thereof, can be analyzed by a machine-learned audio classifier model configured to determine one or more audio classifier labels descriptive of one or more audio events. In some implementations, the audio signal can be analyzed by maintaining a copy of the audio signal (and/or data indicative of the audio signal) in an audio buffer of a memory of the mobile image capture device. At least a portion of the audio signal can be input into the machine-learned audio classifier model. An audio classifier label descriptive of an audio event can then be received as an output of the machine-learned audio classifier model. In some implementations, the audio signal and/or data indicative of the audio signal maintained in the audio buffer can be discarded following analysis, thereby helping to maintain bystander privacy.

For example, in some implementations the data indicative of the audio signal can be analyzed as the data is received, such as by inputting the audio signal into the machine-learned audio classifier model on a rolling or continuous basis as the audio signal is obtained by the audio sensor and/or the audio signal processing pipeline. In some implementations, a rolling window of the audio signal can be analyzed. In some implementations, one or more portions of the audio signal can be analyzed. Following analysis, the audio signal can be discarded and/or overwritten.

The machine-learned audio classifier model can be configured to determine audio classifier labels descriptive of one or more audio events. For example, an audio event can be a sound, noise, or other semantic description of at least a portion of an audio signal, and need not be a particular "action." In some implementations, the machine-learned audio classifier model can be configured to differentiate between human speech and non-speech sounds. For example, in some implementations, the machine-learned audio classifier model can be configured to classify a plurality of non-speech sounds, such as laughter, crying, applause, footsteps, doors opening, floors creaking, high intensity sounds, such as crashes and/or bangs, and/or other sounds.

In some implementations, the machine-learned audio classifier model can be configured to identify one or more image capture cues and output an image capture cue label. For example, a count-down sequence (e.g., "3 . . . 2 . . . 1 . . . "), a song (e.g., the "happy birthday song"), a verbal command ("capture image" or "take picture") or other suitable audio cue or command can indicate that possible image capture opportunity may be occurring or may be forthcoming.

In some implementations, the machine-learned audio classifier model can be configured to determine the presence of one or more individuals, such as by identifying the rustling of papers, footsteps, speech, and/or other sounds, and therefore initiate an image capture mode. For example, in some implementations, the mobile image capture device can be configured to analyze an audio signal, such as on a continuous basis in a power-saving mode, and upon identifying one or more audio events indicative of one or more possible image capture opportunities, such as one or more image capture cues, switch to an image capture mode to capture one or more images. For example, the mobile image capture device can "wake up" from the power-saving mode to begin image capture and analysis. An advantage of using an audio signal as an input in an image capture process is that analyzing the audio signal can use significantly less processing power than analyzing imagery, which can help to extend the battery life of the mobile image capture device.

Responsive to identifying an audio classifier label descriptive of an audio event, the mobile image capture device can be configured to analyze one or more images associated with a particular audio classifier label. In some implementations, one or more captured images can be identified by the mobile image capture device for image analysis based at least in part on an audio classifier label.

In some implementations, an audio classifier label can indicate that one or more images that are temporarily displaced from the audio event should be selected for image analysis. For example, in some implementations, the time displacement can be a time period preceding the audio event. As an example, upon identifying an audio classifier label comprising laughter, one or more images preceding the laughter can be selected for analysis. In some implementations, all images captured within a time period associated with an audio event can be analyzed. For example, all images captured 3 second prior to the laughter can be selected for image analysis.

For example, in some implementations, the mobile image capture device can be configured to capture one or more images and maintain a copy of each captured image in a temporary image buffer. Responsive to identifying an audio classifier label comprising laughter (or other suitable label) the mobile image capture device can identify one or more captured images maintained in the temporary image buffer associated with the audio event, such as an image captured at a time period preceding the audio event (e.g., an image captured a second before the laughter occurred). Similarly, an audio classifier label comprising a crash or bang can be used to identify one or more captured images associated with the crash or bang. In this way, the mobile image capture device can be configured to analyze images that may have captured the cause of the laughter (or other audio event) and therefore be of interest to an individual.

In some implementations, the time displacement can be a time period following the audio event. For example, a countdown sequence, the "happy birthday song", or other image capture cue can indicate that one or more images captured at a forthcoming time should be selected for image analysis. For example, at the end of the "happy birthday song," one or more images can be captured which may be likely to include an individual blowing out candles on a cake. The machine-learned audio classifier model can provide one or more audio classifier labels associated with such forthcoming image capture opportunities, and the mobile image capture device can capture and identify one or more images associated with the one or more audio classifier labels for image analysis.

In some implementations, the mobile image capture device can be configured to identify one or more images captured concurrently with the audio event for image analysis. For example, a bang or a crash can indicate something unexpected is occurring, and may therefore provide an interesting image capture opportunity. In some implementations, the mobile image capture device can select one or more images captured concurrently with the audio event for image analysis.

In this way, the mobile image capture device can identify one or more images associated with an audio classifier label descriptive of an audio event, and can analyze the one or more images associated with the audio classifier label. For example, in some implementations, a scene analyzer of the mobile image capture device can be configured to determine a desirability of a scene depicted by an image can be used to analyze the one or more images associated with the audio classifier label.

The mobile image capture device can operate according to a number of different capture modes in order to capture images for image analysis, such as by the scene analyzer. The different capture modes can correspond to various combinations of different image resolutions and frame rates. Further, the different capture modes may have different energy consumption characteristics or profiles. For example, a capture mode with a larger image resolution and/or frame rate will typically require larger energy expenditure by the device.

Thus, according to another aspect of the present disclosure, the on-device intelligence of the mobile image capture device (e.g., the scene analyzer), can also make control decisions regarding the capture mode of the image capture device. For example, if the scene analyzer determines that a recently captured image depicts a scene that is highly desirable, the scene analyzer can transition the image capture device into a capture mode that has a larger image resolution and/or frame rate, thereby capturing more high resolution images of the desirable scene. In such fashion, the mobile image capture device can reserve operation in capture modes that consume relatively larger amounts of energy for periods of time in which relatively more interesting or desirable scenes are available for image capture, while operating in energy-conserving capture modes during periods of time in which the scenery available for capture is relatively less interesting or desirable.

In some implementations, in addition to frame rate and resolution, the on-device intelligence (e.g., the scene analyzer) of the mobile image capture device can adjust one or more of exposure time, gain, region of interest or crop, binning mode, or other parameters of the image capture device based on an analysis of captured imagery. For example, control signals can be provided to an image sensor of the mobile image capture device to control the above described parameters. In some implementations, the above noted parameters can be adjusted without changing between capture modes of the image capture device. However, different capture modes of the image capture device may respectively correspond to different settings for the above noted parameters.

In some implementations, the mobile image capture device can have a low power framework that has different configurations and/or workflows respectively for the number of different capture modes. Thus, the advanced scene analysis and control features of the mobile image device enable operation of the mobile image capture device for significant periods of time despite having power source, memory availability, computational power, and device temperature constraints.

In some implementations, an image capture device can include one or more lenses (e.g., a wide angle lens); an image sensor; an audio sensor; an imaging pipeline that contains one or more image processing components; a scene analyzer; an audio analyzer; one or more inertial motion units (IMUs); a network interface; and/or a power source such as a battery. The image capture device can also include one or more processors and one or more memory units, including, for example, volatile memory (e.g., DRAM) and non-volatile memory (e.g., flash memory). In some implementations, the image capture device can be a mobile image capture device which is capable of being moved from place to place.

In some implementations, at least during some modes of operation, the image capture device continuously captures a plurality of images (e.g., continuously captures images at a frame rate of at least one frame per second). However, as noted above, the mobile image capture device may ultimately store only certain selected ones of the continuously captured images.

In particular, according to an aspect of the present disclosure, in some modes of operation, the mobile image capture device can be operable to capture a plurality of images that respectively depict a plurality of scenes; maintain a first copy of each of the plurality of images in a temporary image buffer; receive an audio signal; analyze at least a portion of the audio signal to identify one or more audio classifier labels descriptive of an audio event; identify one or more captured images associated with the one or more audio classifier labels; determine a desirability of the scene depicted by at least one of the captured images; and determine, based at least in part on the desirability of the scene of the at least one captured image, whether to store a second copy of such captured image and/or one or more of the other captured images in a non-volatile memory of the mobile image capture device or to discard the first copy of such image(s) from the temporary image buffer without storing a second copy of such image(s) in the non-volatile memory.

More particularly, as noted above, the mobile image capture device can include a scene analyzer which, at least in some modes of operation, is implemented to analyze a desirability of the scene of an image to determine whether to store such image and/or one or more other contemporaneous images. For example, in one example implementation, the mobile image capture device captures (and buffers) a sequence of image frames close to each other in time (e.g. a three second "video" at fifteen frames per second). The scene analyzer can analyze only a subset of the frames (e.g. three of the forty-five frames included in the "video") to determine the desirability of the scene depicted by the frames. Based on such analysis, the scene analyzer can determine whether to save all or part of the sequence of frames. The scene analyzer may also adjust the capture mode of the camera or other capture parameters such as frame rate, resolution, exposure, gain, region of interest, crop, and binning mode based on the analysis of the captured image(s). In addition, in some implementations, the scene analyzer can analyze raw, unprocessed imagery and make or assist in making decisions about processing the imagery with an imaging pipeline.

As an example, in some implementations, the scene analyzer of the mobile image capture device includes at least one neural network and uses such neural network to obtain the at least one descriptor of the desirability of the scene of each analyzed image, as described above. In particular, the scene analyzer can input the image to the at least one neural network and receive the at least one descriptor as an output from that at least one neural network.

As a further example, in some implementations, the at least one neural network of the scene analyzer includes at least one convolutional neural network. As yet another example, in some implementations, the scene analyzer includes a plurality of deep neural networks or other multi-layer non-linear models that respectively analyze a plurality of different characteristics of each input image. Each of the deep neural networks can output at least one descriptor for each image that is input into such deep neural network. As an example, each neural network can provide as output an annotation that describes a characteristic of the scene of an input image. The image can be annotated with the annotation(s).

As examples, the deep neural networks can include one or more of the following: a face detection deep neural network that detects a presence and/or location of one or more faces in the scene of each input image; a face recognition deep neural network that matches one or more faces in the scene of each input image to one or more other faces; a face attributes deep neural network that detects various facial characteristics of one or more faces in the scene of each input image; a face photogenic model that outputs a score which represents a level of photogenicness of a face pose and expression; a facial landmark detection deep neural network that detects one or more facial landmarks such as a position of eyes, a position of nose, or other facial landmarks; an image content deep neural network that outputs one or more semantic labels that describe the scene of each input image; and a photo quality deep neural network that outputs a photo score that describes various photographic quality characteristics of each input image. Various other neural networks which analyze various other characteristics of the input image can be implemented or employed as well. The neural networks can be non-recurrent, recurrent, or a combination thereof. Furthermore, in some implementations, certain neural networks described above (e.g., the face detection neural network) can include or be implemented as a cascade of multiple neural network rather than a single neural network.

In some implementations, the scene analyzer includes at least one multi-headed deep neural network that receives a single set of inputs and provides a plurality of outputs. The plurality of outputs can respectively include a plurality of descriptors of the desirability of the scene of each input image. As one example, two or more of the above described neural networks can be combined to form a multi-headed deep neural network. For example, the face recognition deep neural network can be combined with the face attributes deep neural network to form a multi-headed neural network. In particular, as one example, image portions selected based on the outputs from the face detection deep neural network (e.g., a crop of the image which contains a face detected by the face detection deep neural network) can serve as inputs to a multi-headed neural network which represents a combination of the face recognition deep neural network and the face attributes deep neural network. The multi-headed combination of the face recognition deep neural network and the face attributes deep neural network can output both face recognition output (e.g., a face embedding) and face attribute information rather than having two separate networks for the two purposes.

In some implementations, the output from various portions of the scene analyzer can be used to make better decisions inside an imaging pipeline that processes the images. For example, the output of the face detection deep neural network can be used to set or adjust the exposure in the imaging pipeline in such a way that faces are well-exposed.

According to another aspect of the present disclosure, in some implementations in which the scene analyzer includes a plurality of models such as neural networks, the scene analyzer can also include a model selector that controls which models (if any) an image is input for scene analysis. The model selector can select which models to employ depending on a number of criteria including computational consumption considerations, energy consumption considerations, and/or the results of an initial analysis of the scene of the image. As one example, the model selector can simply implement a predefined schedule or can implement some defined logic regarding an ordering or configuration of models to employ. As another example, the model selector may itself be a model (e.g., neural network), such as a multi-layer non-linear model (e.g., deep neural network).

In some implementations, the model selector includes an attention model that analyzes only a portion of an input image. The attention model can output an indication of whether each input image should be input into at least one of the downstream models for further scene analysis. Thus, the attention model can operate as a prefilter to the other deep neural networks included in the scene analyzer. As one example, the attention model can be a recurrent deep neural network that tracks a face through a succession of images and outputs a probability that each analyzed image depicts the face experiencing joy. The attention model can also output a description of which portion of the next input image the attention model should analyze. In addition, in some implementations, the attention model can also output how much time should pass before capturing and analyzing a second image.

Use of an attention model in this fashion can greatly reduce the energy consumption of the mobile image capture device since the attention model, which limits its capture and/or analysis to only a portion of the images, guards certain downstream models which may analyze the image in its entirety and/or require larger computational expenditure. Further, delaying the period of time recommended by the attention model before again capturing and analyzing imagery can result in power savings. In other implementations, the attention model can be used in place of the other models to guide image storage and/or capture mode decisions. In yet further implementations, one or more of the various deep neural networks discussed above can be replaced with an attention model version of such network.

Thus, the scene analyzer can include a number of models which analyze the scene depicted by an input image and output various descriptors (e.g., annotations) that describe a desirability of the scene of the input image (e.g., describe various image characteristics which impact the desirability of the scene). As noted, the scene analyzer can make intelligent decisions regarding image storage and/or capture mode on the basis of such descriptors. In particular, the scene analyzer can include a save controller, a transfer controller, and/or a mode controller. The save controller can take as input all of the annotations from the models and use such annotations to decide whether or not to process, compress, and/or store the image. The transfer controller can take as input all of the annotations from the models and use such annotations to decide whether or not to send the image. In other implementations, the transfer controller is included in a user computing device rather than the image capture device. The mode controller can determine whether to change the capture mode of the mobile image capture device on the basis of such annotations. The save controller, the transfer controller, and the mode controller can be separate components or can be combined into a single component.

According to additional aspects of the present disclosure, in some implementations, a computing device of a mobile image capture device and/or another computing device can be further configured to generate an edited video including an ambient soundtrack. For example, in some implementations, the mobile image capture device can be operable in a video stream mode wherein the mobile image capture device captures a plurality of sequential image frames and an associated audio signal. In some implementations, the plurality of sequential image frames can be captured at a rate suitable for smooth viewing, such as 15, 30, or 60 frames per second. A contemporaneous audio signal can be captured by an audio sensor of the mobile image capture device, such as a microphone.

In some implementations, the audio signal can be analyzed by an audio analyzer, such as an audio classifier neural network, to determine one or more audio classifier labels associated with one or more portions of the audio signal. For example, in some implementations, non-speech sounds, such as ambient or background sounds can be identified and labelled by the audio analyzer. As examples, such sounds can include environmental sounds, such as waves, wind, rain, thunder, leaves rustling, etc.; animal sounds, such as birds chirping, insects chirping, or other animal sounds; human activity noises, such as vehicle traffic, clapping, footsteps, chatter, restaurant din, laughing, crying, etc.; and/or other sounds. The audio analyzer can be configured to analyze the audio signal and determine one or more audio classifier labels for one or more portions of the audio signal.

The one or more computing devices can further generate an ambient soundtrack comprising at least a portion of the audio signal based at least in part on the one or more audio classifier labels. In some implementations, the one or more computing devices can be configured to intelligently generate the ambient soundtrack using one or more machine-learned models, such as one or more neural networks. For example, in some implementations, the one or more computing devices can be configured to select one or more background or ambient audio portions which capture the essence or feel of what it was like to be where the video stream was captured. For example, for a video stream captured at a beach, the audio signal may include sounds of waves crashing on the beach, seagulls calling out, the wind blowing sand, and/or other sounds. In some implementations, the ambient soundtrack can include one or more audio portions which include sounds of the waves, seagulls, and/or wind.

In some implementations, certain sounds can be classified and rejected or excluded from the ambient soundtrack. For example, foreground sounds such as loud crashes, bangs, or human speech can be identified and classified, and the one or more computing devices can exclude audio portions containing such sounds from the ambient soundtrack. By excluding certain sounds, such as speech, privacy of bystanders can be maintained.

In some implementations, the ambient soundtrack can be generated based at least in part on an audio selection input from a user. For example, in some implementations, an audio analyzer of a mobile image capture device can identify one or more audio classifier labels associated with one or more portions of an audio signal, and select one or more candidate sounds for user input selection. The mobile image capture device can be configured to communicate data indicative of the one or more candidate sounds, such as one or more audio classifier labels, to a user computing device, such as a smartphone or laptop, over a network. In some implementations, a user interface can be provided to allow for a user to review the one or more audio classifier labels associated with the one or more audio portions, and select which audio portions and/or how much of each portion to include in an ambient soundtrack. For example, various user input options can be provided in the user interface, such as selection boxes, slider bars, percentages, or other user input options. A user can select one or more audio classifier labels, and the user input selection can be communicated to an image capture device. The ambient soundtrack can then be generated by selecting one or more portions of the audio signal that has the selected audio classifier label for inclusion in the ambient soundtrack. An advantage provided by identifying one or more candidate sounds for inclusion in an ambient soundtrack and communicating a description of the candidate sounds rather than the sounds themselves to a user is that the amount of processing power and other resources required to obtain the user input selection can be reduced.

In some implementations, a plurality of audio portions can be selected for inclusion in the ambient soundtrack. For example, a first portion of the audio signal, such as waves crashing on a beach, can be selected for inclusion, and a second portion of the audio signal, such as seagulls calling, can also be selected for inclusion in the ambient soundtrack. In some implementations, the ambient soundtrack can be generated by transitioning from the first portion to the second portion. For example, a first portion including waves crashing on the beach can first be included in the ambient soundtrack, and the second portion including the seagulls can be included in the ambient soundtrack following the first portion. In some implementations, the ambient soundtrack can be generated by transitioning from the first portion to the second portion, such as cross-fading from the first portion to the second portion.

In some implementations, the one or more computing devices can analyze at least a portion of the plurality of sequential image frames to determine one or more image labels descriptive of a scene, and generate the ambient soundtrack based at least in part on the one or more image labels. For example, as described herein, one or more neural networks can be used to analyze one or more image frames. In some implementations, the one or more neural networks can be configured to identify various aspects of an image, such as identifying one or more semantic labels (i.e., image labels) that describe the scene of the image frame. For example, a neural network analyzing an image including one or more waves in an ocean scene can identify the waves as such and provide one or more semantic labels descriptive of the waves. In some implementations, the one or more computing devices can generate the ambient soundtrack based at least in part on the one or more image labels. For example, in some implementations, an audio portion including the sound of waves can be selected to correspond to the image frames including the one or more semantic image labels descriptive of waves.

The one or more computing devices can further generate an image stream comprising at least a subset of the plurality of successive image frames. For example, in some implementations, the subset can be used to generate a sped-up, or hyper-lapse image stream.

For example, the one or more computing devices can select a plurality of non-sequential image frames from the plurality of sequential image frames, and arrange the non-sequential image frames consecutively. For example, in some implementations, every other frame, every third frame, every fourth frame, etc. can be selected and arranged consecutively to generate the hyper-lapse image stream. In some implementations, individual non-sequential image frames can be selected and arranged consecutively based on one or more properties of each image frame to generate the hyper-lapse image stream so as to improve the viewability of the hyper-lapse image stream. For example, rather than selecting image frames according to a pattern (e.g., every third image frame), individual image frames can be selected to more smoothly transition from scene to scene or frame to frame.

In some implementations, the one or more computing devices can select a first subset of sequential image frames, select a second subset of sequential image frames, and generate a shortened image stream comprising the first subset of sequential image frames and the second subset of sequential image frames arranged consecutively. For example, the one or more computing devices can select a first subset of image frames corresponding to a first portion of the video stream (e.g., a portion at a beach) and select a second subset of image frames corresponding to a second portion of the video stream (e.g., a portion at a park), and arrange them to be viewed consecutively. Each subset can be played at a regular playback speed, such as a speed corresponding to the speed at which the subset of image frames was captured.

The one or more computing devices can further combine the image stream (such as a hyper-lapse image stream or shortened image stream) with the ambient soundtrack to generate an edited video. In some implementations, the one or more computing devices can combine a plurality of sequential image frames captured in a hyper-lapse mode with an ambient soundtrack to generate the edited video. For example, the image stream (e.g., hyper-lapse or shortened) can be played to provide a visual summary of an experience, while the ambient soundtrack can help to provide a feeling of "what it was like to be there."

In some implementations, an audio portion included in the ambient soundtrack can be selected from a portion of the video stream which is not contemporaneous with one or more image frames which were also selected for the edited video. For example, a subset of image frames depicting a beach scene may be selected for inclusion based on the desirability of the scene depicted in the images. However, a contemporaneously obtained audio portion may include undesirable audio, such as loud noises or human speech. The one or more computing devices can be configured to select a non-contemporaneous audio portion, such as an audio portion including the sound of waves, to be played concurrently with the image frames depicting the beach scene and combine the two in the edited video which captures the essence or feel of the experience without unnecessary, distracting, or harsh foreground sounds.

In some implementations, a user can provide user input to select which type of edited video to generate (such as hyper-lapse or shortened) and/or a length of the video. For example, a user interface can be provided on a user's computing device, such as a smartphone, from which a user can select a video type and/or a length of the video. In some implementations, the user input can be received on a first computing device (e.g., a smartphone), and communicated to a second computing device (e.g., a mobile image capture device) over a network. In some implementations, the second computing device (e.g., the mobile image capture device) can then generate the edited video based at least in part on the user input.

In some implementations, a mobile image capture device can obtain a video stream including a plurality of sequential image frames and an associated audio signal, and intelligently generate an edited video. For example, the mobile image capture device can be configured to obtain the video stream, analyze the audio stream to generate one or more audio classifier labels, generate an ambient soundtrack comprising at least a portion of the audio signal based at least in part on the one or more audio classifier labels, generate an image stream comprising at least a subset of the plurality of sequential image frames, and generate an edited video comprising the ambient soundtrack and the image stream. For example, a mobile image capture device can generate an image stream by intelligently selecting one or more subsets of sequential image frames based at least in part on a desirability of the scene depicted in the image frames using one or more neural networks. Similarly, the mobile image capture device can generate an ambient soundtrack by intelligently selecting one or more audio portions using a machine-learned audio classifier model. In this way, the mobile image capture device can generate an edited video comprising the ambient soundtrack and the image stream.

An advantage provided by performing image analysis and/or audio analysis on a mobile image capture device to generate an edited video is that the amount of processing power and energy required to transmit the video stream can be reduced. Further, by identifying and excluding certain foreground sounds, such as human speech, prior to generating the edited video, the privacy of bystanders can be enhanced.

The systems and methods according to example aspects of the present disclosure can provide a number of technical effects and benefits. For example, the systems and methods provided herein allow for an audio signal to be used in an intelligent image capture process. For example, analysis of audio signals can be used to identify image frames, including temporally displaced image frames, to be analyzed for image capture and retention. Thus, images which otherwise may not have been considered for capture and retention, such as an image capturing a funny event which preceded laughter, can be analyzed and captured. Additionally, the systems and methods of the present disclosure can allow for a reduction in the power consumed by a mobile image capture device, such as by allowing the mobile image capture device to operate in a power-saving mode wherein the device "wakes up" when certain audio signals are received.

Moreover, the systems and methods of the present disclosure can allow for intelligent edited video to be generated by a mobile image capture device. For example, a hyper-lapse or shortened video can be generated which captures the essence or feel of a particular experience by including an ambient soundtrack. Further, the privacy of bystanders can be maintained by excluding and discarding certain audio portions, such as speech.

Further, by leveraging one or more neural networks, the systems and methods of the present disclosure can increase the computational efficiency of a mobile image capture device. For example, a machine-learned audio classifier model can be included on a mobile image capture device, which can be trained to classify certain sounds which can then be used in an intelligent image capture process. Additionally, one or more neural networks can included on a mobile image capture device to analyze the desirability of a scene depicted by one or more images captured by the mobile image capture device. In this way, desirable images can be captured, identified, and stored in an efficient manner.

The systems and methods of the present disclosure also provide improvements to computing technology. In particular, a mobile image capture device including one or more processors and a memory can receive an audio signal and analyze at least a portion of the audio signal with a first neural network to identify a first audio classifier label descriptive of an audio event. The mobile image capture device can then analyze a first image associated with the first audio classifier label descriptive of the audio event with a second neural network to determine the desirability of a scene depicted by the first image. In some implementations, the first image can be temporally displaced from the audio event, such as from a time period preceding or following the audio event. In some implementations, the first image can be an image captured by the mobile image capture device that has been maintained in a temporary image buffer. The mobile image capture device can then determine whether to store a copy of the first image associated with the first audio classifier label based at least in part on the desirability of the scene depicted by the first image or discard the first image. For example, the mobile image capture device can decide whether to store a copy of the first image in a non-volatile memory or discard the first image.

Further, one or more computing devices can obtain data indicative of a video stream comprising a plurality of sequential image frames and an associated audio signal. In some implementations, the video stream can be obtained via a mobile image capture device. In some implementations, the one or more computing devices can be a mobile image capture device, which can generate the edited video. The one or more computing devices can analyze the audio signal with machine-learned audio classifier model to determine one or more audio classifier labels associated with one or more portions of the audio signal. The one or more computing devices can generate an ambient soundtrack comprising at least a portion of the audio signal based at least in part on the one or more audio classifier labels. For example, portions of an audio signal that have audio classifier labels associated with ambient sound can be selected for inclusion in an ambient soundtrack, while portions which has audio classifier labels associated with a foreground sound can be rejected or excluded from the ambient soundtrack. The one or more computing devices can generate an image stream comprising at least a subset of the plurality of successive image frames. In some implementations, the image stream can be a hyper-lapse image stream or shortened image stream. The one or more computing devices can generate an edited video comprising the ambient soundtrack and the image stream.

With reference now to the FIGS., example embodiments of the present disclosure will be discussed in further detail.

FIG. 1 depicts an example audiovisual content capture, curation, and editing system 100 according to an example embodiment of the present disclosure. The system 100 can include at least one image capture device 102 and a user computing device 130. The image capture device 102 can be, for example, a mobile image capture device 102. The system 100 may also include one or more additional mobile image capture devices 104 and 106 and/or a server computing device 150.

The mobile image capture device can include one or more processors 112 and a memory 114. The one or more processors 112 can be any suitable processing device and can be one processor or a plurality of processors that are operatively connected. In some implementations, the processor 112 includes a dedicated vision processing platform that delivers high-performance machine vision and visual awareness in a power-constrained environment. For example, the processor 112 can be a system-on-a-chip (SoC) designed for high-performance, low-power computational imaging. In some implementations, the processor 112 includes hardware, software, and/or firmware that is selectively usable to perform a complete image processing pipeline on-chip. In some implementations, the processor 112 includes multiple vector processors optimized for vision processing workloads.

The memory 114 can include one or more non-transitory computer-readable mediums, such as RAM, ROM, EEPROM, EPROM, flash memory devices, magnetic disks, etc., and combinations thereof. In some example implementations, the memory 114 includes at least a first DRAM memory and a second non-volatile memory. For example, the first DRAM memory can be used for temporary storage of various types of data, such as image data and/or audio data, while the second non-volatile memory can be used for non-temporary storage of various types of data. In some implementations, the non-volatile memory includes a flash memory card. In some implementations, the flash memory card is a Secure Digital (SD) card.

The mobile image capture device 102 can also include a lens cover 116, one or more lenses 118, and an image sensor 120. The image sensor 120 can be a sensor that detects incoming light or other electromagnetic radiation and outputs data sufficient to generate an image of a scene. For example, the image sensor 120 can be a CMOS sensor or a CCD sensor. In some implementations, the one or more lenses 118 can include a wide angle lens such that images resulting from data output by the image sensor 120 are wide angle images.

In some implementations, the lens cover 116 of the mobile image capture device 102 can be manually adjustable between a position that optically blocks the lens 118 and image sensor 120 and a position that does not optically block the lens 118 and image sensor 120. When the lens cover 116 is placed into the position that optically blocks the lens 118 and image sensor 120, the mobile image capture 102 device responds by operating in an ultra-low power mode in which images are not actively captured. However, when the lens cover 116 is removed or otherwise placed into a position that does not optically block the lens 118 and image sensor 120, the mobile image capture device can operate to continuously capture and process the plurality of images.

In some implementations, the lens cover 116 can have a visually distinctive exterior-facing surface. In such fashion, when the lens cover 116 is covering the lens 118 it is readily apparent to persons within the visible range of the image capture device 102 that the mobile image capture device 102 is not actively capturing imagery. For example, the lens cover 116 can have a brightly colored and/or patterned design which provides a glanceable indication regarding the current capture status of the mobile image capture device 102.

In some implementations, the user can adjust the lens cover 116 to provide input control signals for the mobile image capture device 102. As one example, in some implementations, if the user opens and closes the lens cover 116 according to a certain pattern (e.g., three consecutive closings and then openings), the mobile image capture device 102 can respond by deleting a certain period of recently captured imagery (e.g., the last five minutes). Such may enable a quick and easy control input for the user to cause deletion of imagery that depicts undesired scenery. Other operations can be performed according to certain other patterns of lens cover manipulation as well.

In some implementations, the user can also provide control signals for the mobile image capture device 102 by making certain recognizable gestures (e.g., hand gestures) within a field of view of the mobile image capture device 102. As an example, the user can use one or both hands (e.g., index finger and thumb) to form one or two corners of a "frame" for a particular scene. The mobile image capture device 102 can recognize such gesture and capture imagery that includes the "framed" scene. Various other gestures can be used as control inputs, as well, including, for example, a gesture to delete recently captured imagery, as described above.

As noted above, the image sensor 120 can output data sufficient to generate images of a scene viewed by the image sensor 120. The mobile image capture device 102 can include various additional components for processing such data from the image sensor 120 to generate such images. As one example, the mobile image capture device can include an imaging pipeline 122. The imaging pipeline 122 can include one or more image processing components that are operable to process the raw data from the image sensor 122 generate images. Example imaging pipelines 122 according to the present disclosure will be discussed below with further reference to FIGS. 9 and 10.

According to another aspect of the present disclosure, the mobile image capture device 102 can further include a scene analyzer 124. In some implementations, the scene analyzer 124 is operable to analyze a scene depicted by an image captured by the mobile image capture device 102 to assess a desirability of such scene and, based at least in part on such desirability, determine whether to store such image and/or one or more other contemporaneously captured images or to discard such image and/or one or more other images without further storage. In some implementations, the scene analyzer 124 includes one or more machine-learned models, such as neural networks (e.g., deep neural networks) or other multi-layer non-linear models which output descriptors of the desirability of the scene of an input image. In addition, in some implementations, the scene analyzer 124 can also make control decisions regarding the capture mode of the mobile image capture device 102 (e.g., based on the desirability of a depicted scene). Example scene analyzers 124 according to the present disclosure will be discussed below with further reference to FIGS. 11 and 12.

The mobile image capture device 102 can further include one or more audio sensors 121. The audio sensors 121 can be, for example, microphones or other audio sensors configured to obtain audio signals. For example, various sounds (speech, laughter, environmental sounds, etc.) can be received as an audio signal by the one or more audio sensors 121.

The mobile capture device can further include one or more audio pipelines 123. For example, the audio pipeline 123 can be configured to process or convert an audio signal received by an audio sensor 121. For example, various converters (e.g., analog to digital converters), amplifiers, compressors/encoders, or other audio signal processing components can be included in an audio processing pipeline 123. In some implementations, the audio pipeline 123 can receive an audio signal, and convert the audio signal into data indicative of the audio signal. For example, the data indicative of the audio signal can be an uncompressed file format (.WAV, .AIFF, .AU, etc.), a compressed file format (MPEG4, .WMA, .MP3, etc.), or other suitable audio format. In some implementations, data indicative of the audio signal can be stored, such as temporarily, in an audio buffer, such as in a memory 114.

According to another aspect of the present disclosure, the mobile image capture device 102 can further include an audio analyzer 125. In some implementations, the audio analyzer 124 can include one or more machine-learned models, such as one or more neural networks, configured to determine an audio classifier label based on an audio signal/audio data input into the machine-learned model. For example, in some implementations, an audio analyzer 125 can be configured to analyze an audio signal and label one or more portions of the audio signal with one or more audio classifier labels. The one or more audio classifier labels can be descriptive of various audio events, such as laughter, clapping, crying, footsteps, wind, waves, animals, speech, or other sounds. An example audio analyzer 125 according to example aspects of the present disclosure will be discussed in greater detail with respect to FIG. 2.

The mobile image capture device 102 can further include one or more inertial measurement units (IMUs) 126. The inertial measurement units 126 can be electronic devices that measure and report one or more of a velocity, and orientation, and gravitational forces applied to or otherwise associated with the mobile image capture device 102. For example, the inertial measurement units 126 can include one or more accelerometers, gyroscopes, and/or magnetometers. In some implementations, data from the one or more inertial measurement units 126 can be appended to an image captured around the time such data was generated by the inertial measurement units 126. Thus, for example, an image captured by the mobile image capture device 122 can have as associated metadata the information provided by the inertial measurement units 126 at the time of capture. Such information can be usable by downstream processes, for example, in selecting (or rejecting) particular images due to blur, motion, or other undesirable attributes attributable to unintended movement, jostling, or other physical disturbance of the mobile image capture device (e.g., physical disturbance resultant from a user's gait). Thus, image capture timing can be based on data from IMUs 126.

In some implementations, the mobile image capture device 102 can use the data output by the inertial measurement units 126 to determine if the current movement pattern would result in a desirable hyper-lapse capture. For example, inertial data that indicates a walking pattern can trigger the capture of a hyper-lapse. In some implementations, the hyper-lapse image capture can be captured at a frame rate that is less than a playback rate (e.g., 1 frame every 3 seconds vs. 30 frames per second). In some implementations, the mobile image capture device 102 can analyze the data from the inertial measurement units 126 to assist in decisions regarding selecting and/or retaining frames for composing the hyper-lapse. For example, image frames which are well-aligned with each other can be selected for composing the hyper-lapse.

In some implementations, the data output by the inertial measurement units 126 can be monitored to detect inertial measurement data indicative of a user tapping the mobile image capture device 102. More particularly, in some implementations, if the mobile image capture device 102 detects that the user has tapped the mobile image capture device 102 (e.g., according to a certain pattern, such as, for example, three consecutive taps), then the mobile image capture device 102 can respond to such tapping by increasing a probability of image storage, performing image capture and storage without scene analysis for a brief period, transitioning the mobile image capture device 102 into a different capture mode (e.g., a burst capture mode), and/or deleting recently captured imagery. Various touch inputs can be mapped to various touch outputs. In other implementations, the mobile image capture device 102 can include other touch-sensitive components to detect the user tapping alternatively or in addition to monitoring the data output by the inertial measurement units 126.

The mobile image capture device 102 further includes a network interface 128. The network interface 128 can include any number of components to provide networked communications (e.g., transceivers, antennas, controllers, cards, etc.). In some implementations, the mobile image capture device 102 includes a first network interface operable to communicate using a short-range wireless protocol, such as, for example, Bluetooth and/or Bluetooth Low Energy, and also a second network interface operable to communicate using other wireless network protocols, such as, for example, Wi-Fi. In one example, the mobile image capture devices 102, 104, and 106 are operable to communicate with each other using a short-range wireless protocol, such as Bluetooth Low Energy. Further, the image capture device 102 can be operable to communicate with the user computing device 130 using either the short-range wireless protocol (e.g., to transmit user input options) or Wi-Fi or other more robust networking protocols (e.g., for the transfer of captured images and/or edited video).

The mobile image capture device 102 can further include a power source 129. Typically, the power source 129 will be an on-board battery, such as an on-board lithium-ion battery. The mobile image capture device 102 can also be electrically connectable (e.g., via a micro USB port or other electrical and/or data connection port) to a wall outlet or other source of utility power or other appropriately rated power. Plugging the mobile image capture device 102 into a wall outlet can recharge the on-board battery. In some implementations, the mobile image capture device 102 is configured to transfer images to the user computing device 130 over network 180 or perform other highly energy consumptive tasks only when the mobile image capture device 102 is connected to an external power source, such as a wall outlet.

In some implementations, the mobile image capture device 102 can be a wearable image capture device. As an example, the mobile image capture device 102 can be medallion-shaped. For example, the mobile image capture device 102 can have a housing with a circular perimeter. The lens 118 and image sensor 120 of the mobile image capture device 102 can be located at an off-center location of the housing (e.g., not at a concentric center of the circular housing). The housing can be beveled at the outer perimeter. Further, in some implementations, the mobile image capture device 102 can be worn around a user's neck suspended from a lanyard. In other implementations, the mobile image capture device 102 can include a clip that permits the user to clip the mobile image capture device 102 to an article of clothing or other personal items.

According to another aspect of the present disclosure, the mobile image capture device 102 may be operable to communicate with other mobile image capture devices that are located within the same general area (e.g., devices 104 and 106). As one example, the mobile image capture device 102 may be operable to transmit an excitement signal that is wirelessly receivable by one or more other mobile image capture devices that are located proximate to the mobile image capture device (e.g., devices 104 and 106), and vice versa. The excitement signal indicates that the scene depicted by one of the plurality of images recently captured by the mobile image capture device 102 has a relatively large desirability. Thus, the mobile image capture device 102 may send wireless signals (e.g., Bluetooth Low Energy broadcasts) to alert nearby devices (e.g., devices 104 and 106) that an exciting, interesting, or otherwise desirable scene is available for capture.

Furthermore, in some implementations, in response to receipt of an excitement signal (e.g., from one of devices 104 or 106), the mobile image capture device 102 performs at least one of the following: increases a probability that the mobile image capture device 102 will store a non-temporary copy of a recently captured image; attempts to identify a match for one or more embeddings included in the excitement signal within the recently captured image; and increases one or more of a frame rate or a resolution of the image sensor 120 of the mobile image capture device 102.

As one example, in some implementations, receipt of an excitement signal from another device may cause the scene analyzer 124 of the receiving image capture device 102 to be more lenient in its storage decisions (e.g., by reducing various thresholds implemented by a save controller portion of the scene analyzer 124 and/or providing the excitement signal as an input to one or more models included in the scene analyzer 124).

As another example, in some implementations, the excitement signals can include information that enables the receiving image capture device 102 to determine whether an image depicts the same scene or portion thereof that excited the transmitting image capture device. Thus, the receiving image capture device 102 can compare abstractions of its presently viewed scene to the received abstractions to determine whether it is viewing the same scene. If the receiving image capture device 102 determines that it is viewing the same scene, then it can implement enhanced capture and storage of such scene.

Excitement signals can be used for capture synchronization as well. In particular, multiple image capture device owners at the same event may obtain some benefit out of capturing imagery with their mobile image capture device simultaneously. For example, if users share their reflections from the event later on, there will be a higher likelihood of desirable scenes being captured and a greater potential for creating special artifacts because more pictures of the same scene from different angles will have been taken by the set of multiple image capture devices. Excitement signals may also act as a booster for computer vision signals like facial expression and gaze path to inform the mobile image capture device about moments of importance.

However, to ensure the privacy of all parties involved, the information included in the excitement signals will not be sufficient for the receiving image capture device to identify or recreate the specific scene viewed by the transmitting image capture device. Instead, the information included in the excitement signal will typically be an abstraction or other low-dimensional representation of the scene that provides only enough information for the receiving capture device to determine (within some probability range) whether it is presently viewing the same scene or portion thereof. For example, such abstractions may include a histogram of various image characteristics (e.g., color, etc.) or may be embeddings retrieved from one or more hidden layers of one or more of models included in the scene analyzer of the transmitting image capture device.

Referring again to FIG. 1, the system 100 further includes the user computing device 130 and the server computing device 150. In some implementations, the mobile image capture device 102 communicatively connects to the user computing device 130 over a local area network portion of network 180, while the user computing device 130 communicatively connects to the server computing device 150 over a wide area network portion of the network 180. In other implementations, the mobile image capture device 102 communicatively connects to the server computing device 150 directly over the wide area network.

The user computing device 130 can perform audiovisual content curation, obtain user input selections, and enable user editing of images and/or video. In particular, in some implementations, when connected to the mobile image capture device 102 (e.g., after a capture session has been completed), the user computing device 130 can select certain of the images stored at the image capture device for transfer to the user computing device 130. The user computing device 130 can also provide a user interface that enables the user to selectively edit the transferred images. In particular, the user interface can enable various advanced image editing techniques such as computational photography, camera repositioning, etc.

In some implementations, the user interface can further be used to obtain various inputs for generating an edited video. For example, in some implementations, a mobile image computing device 102 can communicate one or more audio classifier labels (or data indicative thereof) to a user computing device 130. The one or more audio classifier labels can be, for example, obtained following analysis of an audio signal, and can describe various portions of the audio signal. A user can select one or more of the audio classifier labels for inclusion in an ambient soundtrack to be included in an edited video. Similarly, a user can provide other inputs, such as the type of video to be generated (e.g., hyper-lapse or shortened video) and how long the video should be. Example user interfaces for obtaining user input selections for generating edited video will be discussed in greater detail with reference to FIGS. 17 and 18.

User computing device 130 can be, for example, a computing device having a processor 132 and a memory 134, such as a wireless mobile device, a personal digital assistant (PDA), smartphone, tablet, laptop, desktop computer, computing-enabled watch, computing-enabled eyeglasses, or other such devices/systems. In short, user computing device 130 can be any computer, device, or system that can interact with the mobile image capture device 102 and (e.g., by sending and receiving data) to implement the present disclosure.

Processor 132 of user computing device 130 can be any suitable processing device and can be one processor or a plurality of processors that are operatively connected. Memory 134 can include any number of computer-readable instructions 138 or other stored data 136. In particular, the instructions 138 stored in memory 134 can include one or more applications. When implemented by processor 132, the one or more applications can respectively cause or instruct processor 132 to perform operations consistent with the present disclosure, such as, for example, executing an image storage, curation, editing, and sharing application. Memory 134 can also store any number of images captured by the mobile image capture device 102 and/or the user computing device 130.

User computing device 130 can further include a display. The display can be any one of many different technologies for displaying information to a user, including touch-sensitive display technologies.

The user computing device 130 also includes a transfer controller 140. In particular, in some implementations, when connected to the mobile image capture device 102 (e.g., after a capture session has been completed), the transfer controller 140 can select certain of the images stored at the image capture device 102 for transfer to the user computing device 130. For example, such selection can be guided by various image attributes as reflected in various metadata annotations provided by the mobile image capture device 102 respectively for the stored images. Generally, the most desirable images will be selected for transfer, while maintaining a diversity of imagery.

In some implementations, the transfer controller 140 can perform an optimization algorithm to select which of the images stored in the memory 114 of the mobile image capture device 102 to request for transfer. The optimization algorithm can have a plurality of associated objectives which include, for example, at least a diversity of settings and a diversity of depicted persons, while still requesting transfer of the most desirable images. In some implementations, the transfer controller 140 can implement a submodular function to select which images to request for transfer.

In some implementations, the user computing device 130 can receive portions of an audio signal to be used in an edited video transferred from a mobile image capture device 102. For example, as described in greater detail herein, following analysis of an audio signal, one or more portions of an audio signal can be selected for inclusion in an ambient soundtrack. For example, certain foreground sounds, such as human speech, can be excluded, while other sounds, such as ambient or background sounds, can be selected for inclusion. In some implementations, the one or more audio portions containing such ambient or background sounds can be transferred from a mobile image capture device 102 to the user computing device 130. Further, in some implementations, a video stream can similarly be transferred, and an edited video can be generated by the user computing device 102, as described herein. In some implementations, the edited video can be generated by the mobile image capture device 102, and transferred to the user computing device 130. In some implementations, the transfer controller 140 can be used to transfer the edited video and/or portions of an edited video from the mobile image capture device 102 to the user computing device 130.

In some implementations, the user computing device 130 further includes a best shot selector 142. The best shot selector 142 can be implemented to select at least one highlight image from a group of images (e.g., at least one highlight image for each moment within a reflection). For example, the best shot selector 142 can select the highlight images based on the annotations or other metadata included for each of the images. In some implementations, the best shot selector 142 normalizes each image in a moment relative to its peer images within such moment prior to performing highlight selection. Thus, selection of a highlight image for each moment can be based at least in part on a comparison of the annotations of each image included in such moment relative to the annotations of at least one other image included in such moment.

In some implementations, the best shot selector 142 can also be implemented to determine a recommended composition for one or more images. For example, the recommended composition may correspond to only a portion of an image (e.g., a dewarped portion of a wide angle image). The recommended composition may also correspond to a certain perspective of a virtual camera relative to the image. The best shot selector 142 can determine the recommended composition based at least in part on the annotations or other metadata associated with the image. For example, the recommended composition may correspond to a dewarped portion of a wide angle image that includes only faces that correspond to entities included in the set of entities that have elevated importance to the user.

In some implementations, a gaze angle of a subject depicted by an image can be used to determine the recommended composition for such image. As an example, the human subject's extremity of angle of the face (e.g., up/down, left/right) can be used to assist in determining how much of the surrounding area should be included in a crop (e.g., in the recommended composition). In some implementations, determining the recommended composition can include selecting the most salient, well lit, and/or compositionally interesting portions within a frame.

In further implementations, the best shot selector 142 and/or other components of the user computing device 130 can perform semantic scene segmentation (e.g., at a pixel-level rather than according to bounding boxes). The semantic scene segmentation can be used for composition, blurring, or selective application of other editing techniques to certain portions of an image.

The user computing device 130 also includes a user interface controller 144. The user interface controller 144 can be implemented to provide a user interface that enables the user to temporally and/or spatially explore images within a reflection. In particular, the user interface controller 144 can be implemented to detect and respond to certain user input with appropriate user interface interactions.

The user computing device 130 also includes a computational photographer 146. The computational photographer 146 can be implemented to perform various image editing or image synthesis techniques with respect to images included in a reflection. As one example, after the user has adjusted the perspective of the camera, the computational photographer 146 can synthesize a new image that corresponds to the selected perspective by recalculating one or more camera parameters (e.g., focus, lens distortions, lighting, etc.) that would result from the new perspective. As other examples, the computational photographer 146 can be implemented to perform advanced image processing techniques such as superresolution, hyper-lapse, texture mapping, depth mapping, view synthesis, etc. Likewise, the computational photographer 146 can be implemented to provide adjustable controls for ISO, depth of field, stabilization, and other image parameters or characteristics.

Each of the transfer controller 140, the best shot selector 142, the user interface controller 144, and the computational photographer 146 can include computer logic utilized to provide desired functionality. Thus, each of the transfer controller 140, the best shot selector 142, the user interface controller 144, and the computational photographer 146 can be implemented in hardware, firmware and/or software controlling a general purpose processor. In some implementations, each of the transfer controller 140, the best shot selector 142, the user interface controller 144, and the computational photographer 146 includes program code files stored on the storage device, loaded into memory 134 and executed by processor 132 or can be provided from computer program products, for example, computer executable instructions 138 that are stored in a tangible computer-readable storage medium such as, for example, a RAM disk or card or other computer-readable optical or magnetic media.

Server computing device 150 can be implemented using one or more server computing devices and can include a processor 152 and a memory 154. In the instance that server computing device 150 consists of multiple server devices, such server devices can operate according to any computing architecture, including a parallel computing architecture, a distributed computing architecture, or combinations thereof.

Processor 152 can be any suitable processing device and can be one processor or a plurality of processors which are operatively connected. Memory 154 can store instructions 158 that cause processor 152 to perform operations to implement the present disclosure.

Server computing device 150 can also include a model trainer 160. Server computing device 150 can implement the model trainer 160 to train and/or re-train one or more models (e.g., neural networks) such as multi-layer non-linear models (e.g., deep neural networks). As examples, the model trainer 160 can perform back propagation techniques such as batch gradient descent or stochastic gradient descent to train the models. The model trainer 160 can also leverage dropout techniques to combat model overfitting. The model trainer 160 can train models using processed images and/or unprocessed images as training images.

Thus, in some implementations, the server computing device 150 can implement model trainer 160 to train new models or update versions on existing models on additional training data. As an example, the model trainer 160 can use images hand-labeled as being desirable to train one or more models to provide outputs regarding the desirability of an input image. In particular, in some implementations, the additional training data can be images that the user created through the editing interface. As another example, the model trainer 160 can use edited video clips which include ambient soundtracks to train one or more models to intelligently select audio portions and image streams for inclusion in an edited video. Thus, updated versions of the models of the image capture device 102 can be trained by model trainer 160 on personalized data sets to better infer, capture, and store images and/or video which satisfy the particular tastes of the user. In other instances, the additional training data can be anonymized, aggregated user feedback.

The server computing device 150 can periodically provide the mobile image capture device 102 with one or more updated versions of one or more models included in the scene analyzer 124, the audio analyzer 125, or other models. The updated models can be transmitted via the user computing device 130 or directly to the mobile image capture device 102 via network 180. In other implementations, the user computing device 130 can also include a model trainer that performs personalized model training as described above for a particular mobile image capture device 102.

The model trainer 160 can include computer logic utilized to provide desired functionality. Thus, the model trainer 160 can be implemented in hardware, firmware and/or software controlling a general purpose processor. In some implementations, the model trainer 160 includes program code files stored on the storage device, loaded into memory 154 and executed by processor 152 or can be provided from computer program products, for example, computer executable instructions that are stored in a tangible computer-readable storage medium such as RAM hard disk or card or other computer-readable optical or magnetic media.

Network 180 can be any type of communications network, such as a local area network (e.g., intranet), wide area network (e.g., Internet), or some combination thereof and can include any number of wired or wireless links. In general, communication between the server computing device 150 and the user computing device 130 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 150 can communicate with user computing device 130 over network 180 by sending and receiving data.

Further, any of the processes, operations, programs, applications, or instructions described as being stored at or performed by the server computing device 150 can instead be stored at or performed by the user computing device 130 in whole or in part, and vice versa. In particular, in some implementations, the mobile image capture device 102 can directly communicatively connect to the server computing device 150 and the server computing device 150 can perform the image curation, editing, storage, and sharing functions attributed to the user computing device 130 elsewhere in the present disclosure (e.g., via a web application). Likewise, any of the processes, operations, programs, applications, or instructions described as being stored at or performed by the mobile image capture device 102 can instead be stored at or performed by the user computing device 130 in whole or in part, and vice versa. For example, in some implementations, the transfer controller 140 can be located at the mobile image capture device 102 rather than the user computing device 130.

Figure 2:
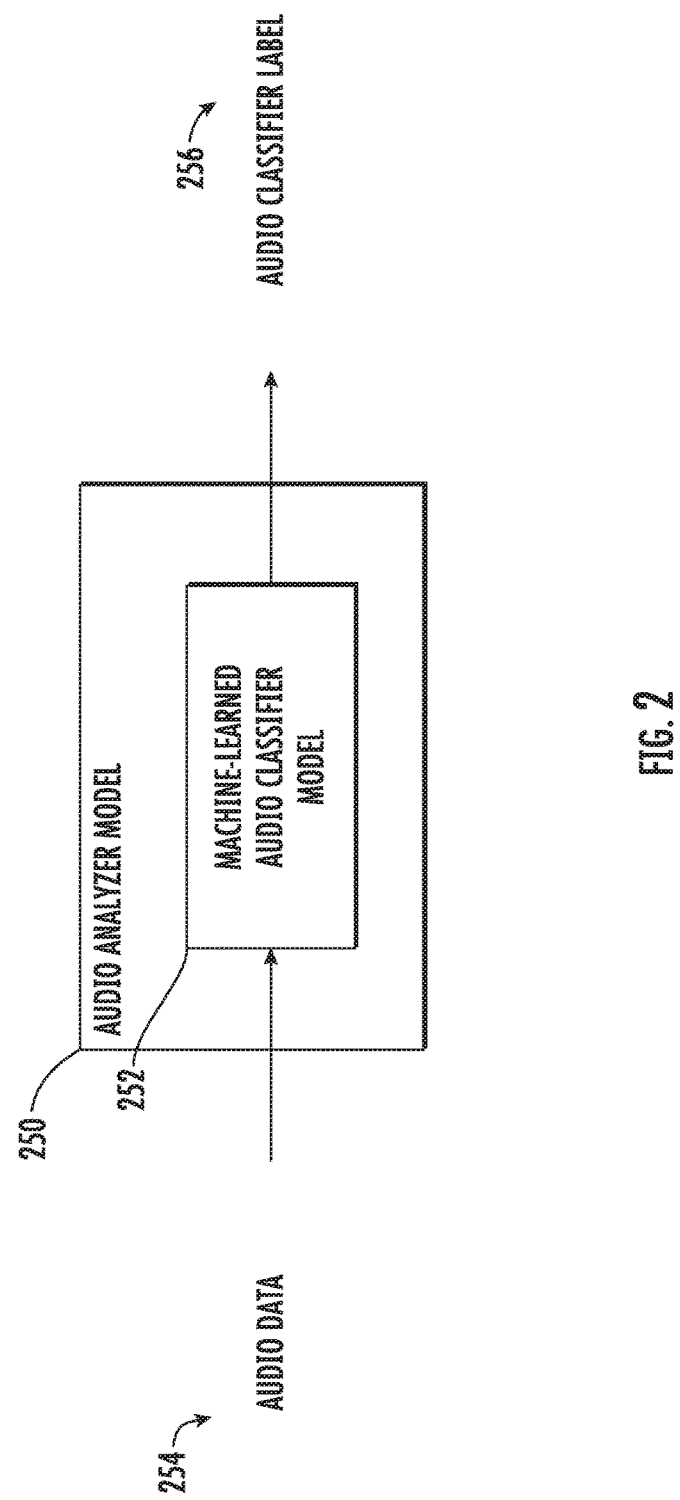
FIG. 2 depicts a block diagram of an example audio analyzer model according to example aspects of the present disclosure.

FIG. 2 depicts a block diagram of an example audio analyzer model 250 according to example aspects of the present disclosure. The audio analyzer model 250 can be a machine-learned model configured to determine an audio classifier label 256. In some implementations, the audio analyzer model 250 is trained to receive a set of input data 254 descriptive of an audio signal. For example, the audio signal can be received by a microphone, and processed/converted into audio data 254. The audio data 254 can be input into the audio analyzer model 250 and, as a result of receipt of the audio data 254, provide an audio classifier label 256 descriptive of an audio event. Thus, in some implementations, the audio analyzer model 250 can include a machine-learned audio classifier model 252 that is operable to identify the one or more audio events, and output an audio classifier label 256 descriptive of the one or more audio events. In some implementations, the machine-learned audio classifier model 252 can be a neural network (e.g., deep neural network).

In some implementations, the machine-learned audio classifier model 252 can be configured to classify various human speech and/or non-speech sounds, and differentiate between speech and non-speech sounds. For example, in some implementations, the machine-learned audio classifier model can be trained to classify a plurality of non-speech sounds, such as laughter, crying, applause, footsteps, doors opening, floors creaking, high intensity sounds, such as crashes and/or bangs, chatter, restaurant din, vehicle traffic, and/or other sounds. In some implementations, various environmental sounds, such as waves, wind, rain, thunder, leaves rustling, or other environmental sounds can be classified. In some implementations, various animal sounds, such as birds chirping, insects chirping, dogs barking, or other animal sounds can be classified.

In some implementations, the machine-learned audio classifier model 252 can be trained using a training dataset which has been labeled with various sound classification labels. For example, a video clips which contain closed-caption labels (e.g., "[laughter]") can be used as a training dataset to train the machine-learned classifier model 252 to classify various speech and non-speech sounds.

In some implementations, the machine-learned audio classifier model 252 can be configured to identify one or more image capture cues and output an image capture cue identifier label. For example, in some implementations, certain speech sounds can be classified, such as a countdown sequence (e.g., "3 . . . 2 . . . 1 . . . "), a song (e.g., the "happy birthday song"), a verbal command ("capture image") or other speech can be classified.

In some implementations the audio data 254 (i.e., data indicative of an audio signal) can be analyzed as the audio data 254 is received, such as by inputting the audio data 254 into the audio analyzer model 250 on a rolling or continuous basis as the audio data 254 is obtained by an audio sensor 121 and/or an audio signal processing pipeline 123. In some implementations, a rolling window of the audio data 254 can be analyzed. In some implementations, one or more portions of the audio data 254 can be analyzed. In some implementations, the audio data 254 can be discarded and/or overwritten following analysis, such as when the audio data 254 is used in an image capture process. In some implementations, only certain portions of audio data 254 can be maintained, such as portions of the audio data 254 which are selected for inclusion in an ambient soundtrack in an edited video, as described herein. For example, certain foreground sounds, such as human speech, can be excluded from an ambient soundtrack, as disclosed herein, and discarded following analysis.

Figure 3:
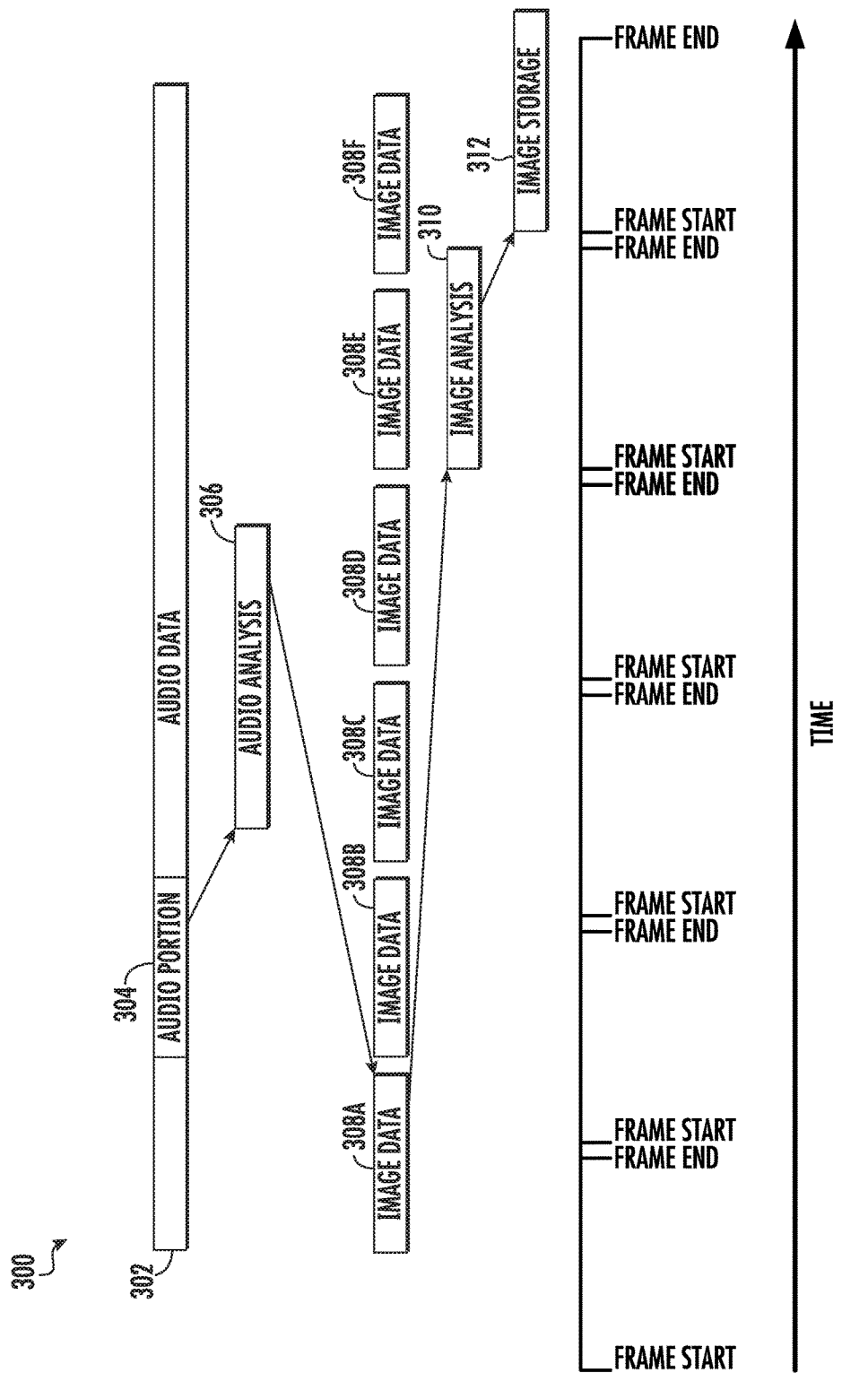
FIG. 3 depicts a visual representation of data flow versus time in an example image processing framework according to example aspects of the present disclosure.

FIG. 3 depicts a visual representation 300 of data flow versus time in an example image processing framework according to example aspects of the present disclosure. In particular, FIG. 3 depicts one example timing of data flow in an image capture process in which an audio signal is used to select and/or capture an image based on a time displacement for a time period preceding an audio event. In other implementations, an image can be captured based on a time displacement for a time period following an audio event or for an image capture concurrently with an audio event. In some implementations, the image processing framework depicted in FIG. 3 can be implemented in an image capture device, such as an image capture device depicted in FIG. 1.

As shown, an audio signal, such as audio data 302, can be received or obtained, such as by an audio sensor of an image capture device. The audio signal can be processed and/or converted, as disclosed herein.

At 306, the audio data 302 can be analyzed, such as by a machine-learned model configured to determine an audio classifier label. For example, in various implementations, the audio data 302 can be analyzed as the audio data 302 is received, such as on a rolling or continuous basis. In some implementations, a window of audio data 302 can be analyzed. In some implementations, different audio portions, such as discrete audio portions, can be analyzed.

For example, as depicted in FIG. 3 an audio portion 304 can be analyzed by a machine-learned model following receipt of the audio data 302. Thus, as depicted, at 306 at least a portion 304 of the audio data 302 can be analyzed. In some implementations, one or more audio classifier labels descriptive of an audio event can be determined during the audio analysis 306.

For example, in one implementation, an audio portion 304 can be analyzed at 306, and an audio classifier label comprising laughter can be identified. For example, the machine-learned model can be trained to classify laughter and/or other human speech or non-speech sounds. Following audio analysis 306, one or more images associated with the audio classifier label can be identified, such as for image capture or further image analysis.

For example, in some implementations, an image capture device can be configured to obtain image data 308, such as at regular intervals in a continuous capture mode. For example, as depicted, a plurality of images (i.e., image data 308A-F) can be captured over time. In some implementations, the plurality of image data 308A-F can be captured by an image capture device, and maintained in a temporary image buffer. For example, a copy of each captured image 308A-F can be temporarily maintained in a temporary image buffer of a memory of the image capture device.

In some implementations, responsive to determining an audio classifier label descriptive of an audio event, a time displacement amount associated with the audio classifier label can be determined. For example, in some implementations, for an audio classifier label comprising laughter, a negative time displacement amount can be determined. For example, a time displacement of 1-3 seconds prior to the audio event associated with the audio classifier label can be determined.

In some implementations, for an audio classifier label comprising an image capture cue, a positive time displacement amount can be determined. For example, for a countdown sequence label (e.g., "3 . . . , 2 . . . , 1 . . . "), a time displacement corresponding to the end of the countdown sequence can be determined.

In some implementations, the time displacement amount can be used to identify one or more images associated with the audio classifier label. The one or more images can be temporally displaced from the audio event, such as images captured prior to the audio event or following the audio event. For example, in one implementation in which an audio event is laughter, an image 308A that was captured at a time prior to the receipt of the audio portion 304 of the audio signal 302 labeled with the laughter label can be identified. By identifying images which occurred prior to the laughter event, images which may have captured the cause of the laughter can be selected for storage and/or further analysis.

Similarly, in some implementations, an audio portion 304 can be labeled with an image capture cue label, and an image 308F captured at a time following the audio portion 304 can be identified. Moreover, this can be used to decide when and whether to capture an image, such as whether to initiate an image capture mode. For example, in some implementations, an image capture device can operate in a low power or power-saving mode wherein the image capture device analyzes at least a portion 304 of an audio signal 302, and following analysis, begins an image capture process. For example, the image capture device can "wake up" and capture one or more images following audio analysis 306, such as images 308E-F.

Further, in some implementations, such as an audio classifier label comprising a bang or crash, a concurrently captured image can be identified. For example, for an audio portion 304 comprising a crash label, a concurrently captured image 308B can be identified.

In some implementations, an identified image, such as a captured image 308A-F associated with an audio classifier label, can be stored. For example, for an audio classifier label comprising a laughter label, a negative time displacement amount can be used to identify an image 308A that was captured by an image captured device at a time prior to receipt of the audio portion 304 labeled with the laughter label of the audio signal 302. For example, in some implementations, an image capture device can store a copy of the captured image 308A in a non-volatile memory of the image capture device. Similarly, using other time displacement amounts (or a zero displacement for concurrently identified images), a concurrently captured image 308B and/or an image 308F captured at a future time can be stored in the non-volatile memory of the image capture device. In this way, a time displacement amount can be determined based at least in part on an audio classifier label, and the time displacement amount can be used to identify one or more captured images associated with the audio classifier label. Further, the one or more identified images can then be stored on an image capture device, such as in a non-volatile memory. Thus, according to example aspects of the present disclosure, in some implementations, analysis of at least an audio portion 304 can be used to identify one or more images for storage.

In some implementations, one or more images associated with an audio classifier label can be identified, and further can be analyzed. For example, an image 308A associated with a laughter label can be identified and selected for image analysis 310. For example, in some implementations, an image associated with an audio classifier label can be analyzed by a machine-learned model configured to determine a desirability of a scene depicted by the image. For example, as disclosed herein, one or more neural networks can be used to determine a desirability of a scene depicted by an image.

In some implementations, following image analysis 310, an image 308A can be stored, such as in an image storage process 312. In some implementations, the image 308A can be stored by storing a copy of the image 308A in a non-volatile memory of an image capture device. In some implementations, an image capture device can determine whether to store a copy of the image 308A or discard the image 308A without storing a copy of the image 308A based at least in part on the desirability of the scene depicted by the image 308A. For example, in some implementations, images which did not capture a human can be discarded. Similarly, other descriptors of the desirability of a scene depicted by the image 308A can be used, such as a facial recognition score or face attribute score, photo quality score, one or more semantic labels, or other descriptors of desirability as disclosed herein.

In this way, at least a portion of an audio signal can be used to determine an audio classifier label descriptive of an audio event. One or more images associated with the audio classifier label can be identified, such as one or more images temporally displaced from the audio event. The one or more images can then be further analyzed, such as to determine a desirability of a scene depicted by the images, and/or selected for storage, such as in a non-volatile memory. Further, in some implementations, the one or more images can be selected for storage or discarded based at least in part on a desirability of the scene depicted by the one or more images.

Figure 4:
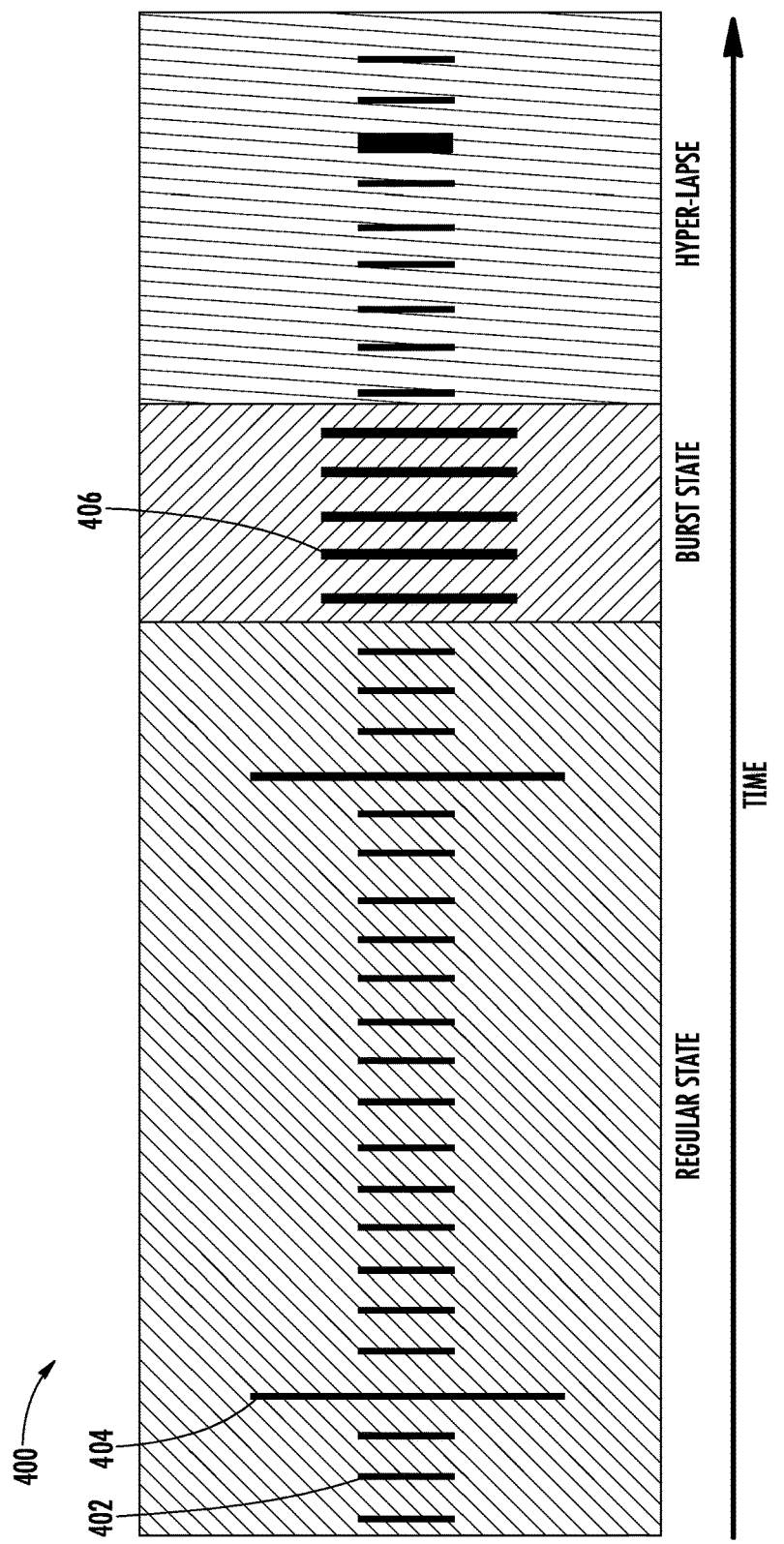
FIG. 4 depicts a visual representation of example image capture modes of an example mobile image capture device according to example aspects of the present disclosure.

FIG. 4 depicts a visual representation 400 of example capture modes of an example image capture device according to an example embodiment of the present disclosure. In the visual representation 400, vertical bars are representative of captured images, with the vertical length of the bar representative of the resolution of the captured images. In particular, shorter bars (e.g., bar 402) denote low-resolution images while longer bars (e.g., bar 404) denote high or full resolution images. Horizontally thicker bars denote images that are selected for compression and storage.

Unlike conventional digital cameras and mobile imagers, the image capture devices of the present disclosure can change capture frame rate and resolution on the fly. Particular example capture modes are illustrated in FIG. 4. However, the mobile image capture device can operate according to other capture modes as well.

On the left hand side of visual representation 400 is a visual representation of a regular or sustained capture state. During the regular capture state of the image capture device, the image capture device may periodically transition between a low resolution image capture mode and a high resolution image capture mode. In such fashion, high resolution or full resolution frames can be captured relatively infrequently (e.g., at an average of 0.1 to 5 frames per second (fps)), while low resolution frames can be captured more frequently (e.g., at an average of 5 to 20 fps). "Captured" here means at the image sensor level. However, note that while an image is "captured" by the image sensor, not all images will necessarily be selected for compression and storage.

In some implementations, high or full resolution frames can be 12 megapixel (MP) images. The high resolution frames can be an entire frame at a maximum resolution of the image sensor. These high resolution frames can be the strongest candidates for ultimate compression and storage. The frame rate for full resolution images can be increased in different capture modes, which will be discussed further below.

In some implementations, low resolution frames can be 1.33 MP images. The low resolution frames can be used for scene analysis, and may be even further scaled down (e.g., to 500×375) if desired. The low resolution frames can also be used for various other purposes such as: allowing users to preview an image through a display in the user computing device (e.g. capture visualizations based on a thumbnail (e.g. 100×75) of the image); generating hyper-lapse (computer vision) artifacts; and/or performing superresolution techniques in which the resolution of portions of a low resolution image are enhanced based on full-resolution frames that are closely related in time.

Further, in some implementations, in addition to high resolution images and low resolution images, the image sensor may be further operable to provide mid resolution images that are, for example, 3 MP. In some implementations, mid resolution images can be captured at up to 30 fps during a burst capture mode. Mid resolution images may be useful for scenarios including low-light binning. In particular, in order to reduce the amount of noise, it may be desirable to perform binning in the sensor such that temporal noise in the sensor is reduced. While this does sacrifice the spatial resolution, it may be desirable to perform such operation when exposure time may not be increased even further. In some instances, the image capture device's exposure time may be relatively short in order to reduce the amount of motion blur. Two by two binning reduces the image noise by a factor of two in terms of standard deviation.

The image capture device can also operate in a burst capture mode or burst state, which is shown after the regular sustained state in FIG. 4. The image capture device can transition to the burst state based on signals from the scene analyzer or in response to a manual trigger from the user. Thus, burst capture mode is typically performed when a highly desirable scene has been recognized and the device attempts to maximize an amount of imagery captured of such scene. Therefore, during burst capture mode, the image capture device can capture mid or high resolution images at a relatively higher frame rate (e.g., 15 fps for high resolution or 30 fps for mid resolution). Alternatively, low resolution images can be captured at a high frame rate and the low resolution images can go through super-resolution to obtain final high resolution data. In some implementations, the burst capture mode can be used to obtain a plurality of sequential image frames in a video stream.

In some implementations, all of the images captured during burst mode are compressed and stored at the non-volatile memory, with little to no scene analysis being performed. In particular, by performing little to no scene analysis, the limited resources of the image captured device can be freely dedicated to compression and storage of the high or mid resolution imagery. For example, writing to non-volatile memory can be performed on the order of 20 to 25 MB per second. However, more resources may be dedicated to scene analysis when burst captures include low resolution images which may later go through super-resolution. Burst capture mode can be sustained for a period of time after which the image capture device reverts to the regular state. In some implementations, images captured during burst mode can be analyzed at a later time, such as to make an edited video, as disclosed herein.

In some implementations, the image capture device may also be able to operate in a hyper-lapse capture mode, which is shown at the right hand side of FIG. 4. In the hyper-lapse capture mode, which is geared towards capture of imagery usable to generate a hyper-lapse stabilized video, the image capture device can capture low or mid resolution imagery for a sustained period of time.

In particular, in the hyper-lapse capture state, one emphasis is in a smooth transition between shots. Low or mid resolution images can be captured at a relatively high frame rate (e.g., 15 fps). Not all of the frames are processed, compressed, and saved. For example, analysis for hyper-lapse capture can select frames such that the output is roughly 1 frame saved per second. In particular, frames captured with jerky motion can be discarded. Thus, motion analysis can be a central component of hyper-lapse frame selection. As such, the scene analysis performed during hyper-lapse capture state can have different objectives versus the regular capture state or may generally be more lightweight. Further, in some implementations, high resolution images can be interspersed with low or mid resolution images in hyper-lapse capture mode. In some implementations, a hyper-lapse capture can be combined with an ambient soundtrack to generate an edited video, as disclosed herein.

Figure 5:
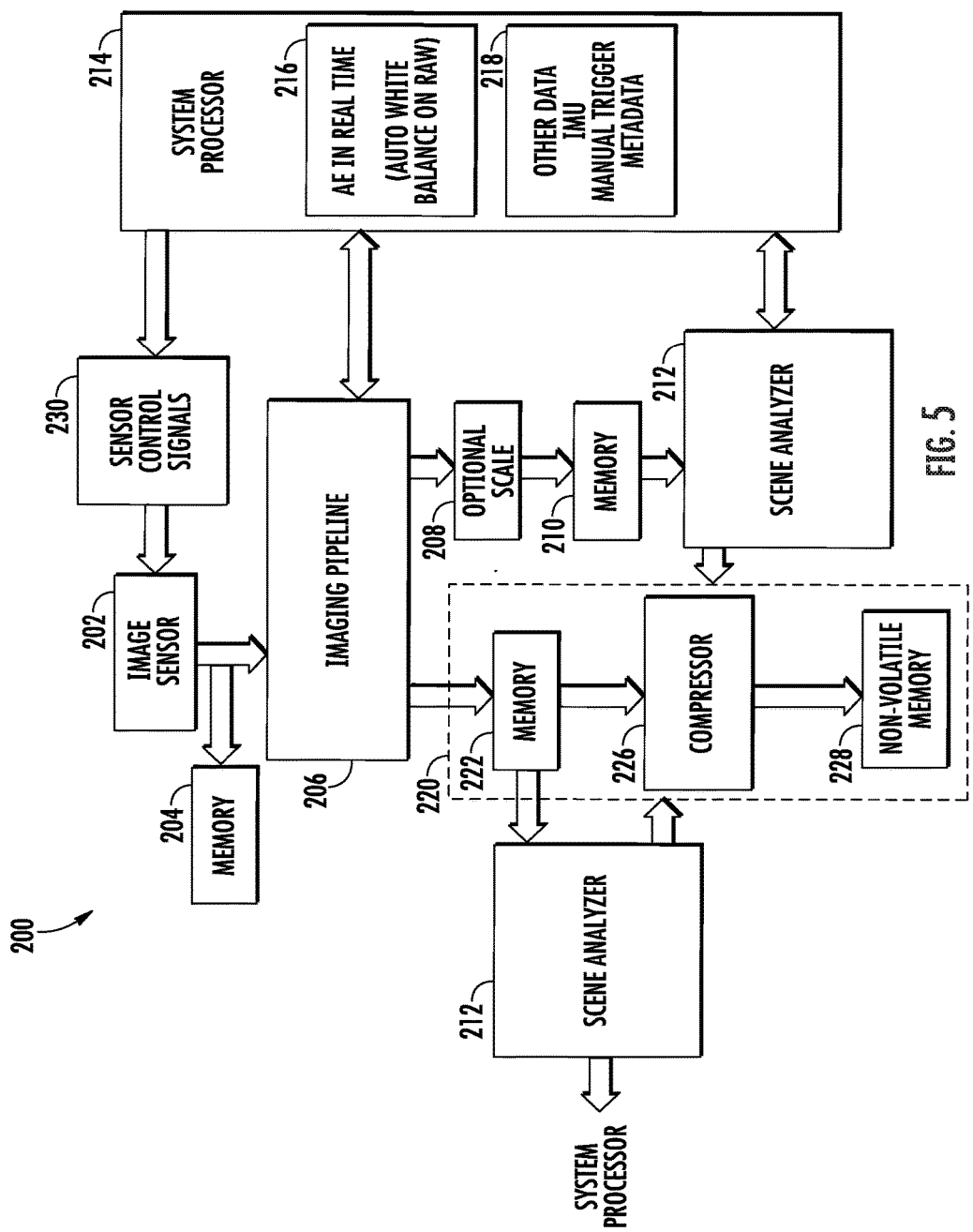
FIG. 5 depicts a schematic of an example image processing framework according to example aspects of the present disclosure.

FIG. 5 depicts a schematic of an example image processing framework 200 according to an example embodiment of the present disclosure. In particular, the schematic depicted in FIG. 5 illustrates relationships between components which permit multiple potential data paths or work flows through the framework 200. The image processing framework 200 can be included in an image capture device.

The image processing framework 200 includes an image sensor 202 which outputs raw image data. For example, the raw image data can be a Bayer RAW image. The raw image data can be communicated to a first memory 204 and/or an imaging pipeline 206. As one example, the first memory 204 which stores the raw image data output by the image sensor 202 can be denominated as a raw temporary data buffer and can be, for example, DRAM memory. In some implementations, the imaging pipeline 206 streams the raw image data directly from the image sensor 202. In such scenario, the temporary data buffer may optionally store processed images instead of the raw image data.

The imaging pipeline 206 takes the raw image data received from the image sensor 202 and processes such raw image data to generate an image. For example, the processed image can be a RGB image, a YUV image, a YCbCr image, or images according to other color spaces. In addition, the imaging pipeline 206 can be operatively connected to a system processor 214. The system processor 214 can include hardware blocks 216 that assist the imaging pipeline 206 in performing Debayer filtering, RAW filtering, LSC filtering, or other image processing operations. The RAW filter stage can provide image statistics 216 for auto exposure in real time and/or auto white balance operations. Software filters may be employed as well. Additional discussion of an example imaging pipeline is provided with respect to FIGS. 9 and 10.

Depending on the capture mode of the image capture device and/or other parameters, the imaging pipeline 206 can provide the image to an optional scaler 208 or a second memory 222, which will be discussed further below. The scaler 208 can down sample the received image to output a lower resolution version of the image. Thus, in some implementations, the scaler 208 can be denominated as a down sampler.

The scaler 208 provides the image to a third memory 210. The third memory 210 may be the same memory or a different memory than the second memory 222. The second memory 222 and/or the third memory 210 can store temporary copies of the image. Thus, the second memory 222 and/or the third memory 210 can be denominated as temporary image buffers. In some implementations, the second memory 222 and/or the third memory 210 are DRAM. In addition, in some implementations, downsampling can be performed at the beginning of the imaging pipeline such that the imaging pipeline is enabled to run at a lower resolution and conserve power to a greater degree.

The second memory 222 and/or the third memory 210 can provide the image information to a scene analyzer 212. In some implementations, the scene analyzer 212 is operable to analyze a scene depicted by the image to assess a desirability of such scene and, based at least in part on such desirability, determine whether to store a non-temporary copy of such image or to discard the temporary copy of such image without further storage. The scene analyzer 212 can also access various data 218 stored at the system processor 214.

If the scene analyzer 212 determines that a non-temporary copy of the image should be stored, then the scene analyzer 212 can provide the image to a compression component 226. In other implementations, the compression component 226 can receive the image from the second memory 222 and/or the third memory 210. In yet other implementations, if the scene analyzer determines that a non-temporary copy of the image should be stored, then the raw image data stored in the first memory 204 will be retrieved and processed by the imaging pipeline 206 and the resulting processed image will be provided to the compression component 226.

The compression component 226 compresses the received image. The compression component 226 can be a hardware component or image compression software implemented on a processor (e.g., the system processor 214). After compression, a non-temporary copy of the image is written to a non-volatile memory 228. For example, the non-volatile memory 228 can be an SD card.

In some implementations, one or more images associated with an audio classifier label can be stored without first being analyzed by the scene analyzer 212. For example, a time displacement associated with an audio classifier label can be used to identify one or more images associated with the audio classifier label, and the one or more images can be stored, such as in the non-volatile memory 228.

It should be noted that, in some implementations, the image compression path 220 marked in a dotted box may not be active when an image is not chosen for compression and storage. Thus, in some implementations, the output of the scene analyzer 212 can be used to either turn on the image compression path 220 or control the image sensor 202. In particular, the scene analyzer 212 (e.g., in partnership with the system processor 214) can provide sensor control signals 230 to control the image sensor 202, as will be discussed further below. Further, in some implementations, the output of the scene analyzer 212 can be used to either turn on or off the imaging pipeline path as well. In addition, in some implementations and/or capture modes, portions of the scene analysis can be performed with respect to low-resolution images whereas other portions of the scene analysis can be performed on crops of high-resolution images (e.g., facial expression analysis may require crops of high resolution images).

In some implementations, the output from the image sensor 202 can control most of the timing through the imaging pipeline 206. For example, image processing at the imaging pipeline 206 can be roughly frame-synced to transfer at the image sensor receiver (e.g., an MIPI receiver). Each of the stages of image processing 206 can have some delay which causes the output to be a few image sensor rows behind the input. This delay amount can be constant given the amount of processing that happens in the pipeline 206.

The scene analyzer 212 can start shortly after the imaging pipeline 206 has written all the lines of one image to memory. In other implementations, the scene analyzer 212 starts even before the imaging pipeline 206 has written all the lines of one image to memory. For example, certain models included in the scene analyzer (e.g., a face detector model) can operate on subsets of the image at a time and therefore do not require that all of the lines of the image are written to memory. Compression can be performed after the scene analyzer determines that the image is worth saving and compressing. In other implementations, instead of analyzing images that have been fully processed by the image processing pipeline 206, the scene analyzer 212 can analyze Bayer raw images or images that have only been lightly processed by the imaging pipeline. In some implementations, only images associated with one or more audio classifier labels are selected for analysis by the scene analyzer 212, as described herein.

Figure 6:
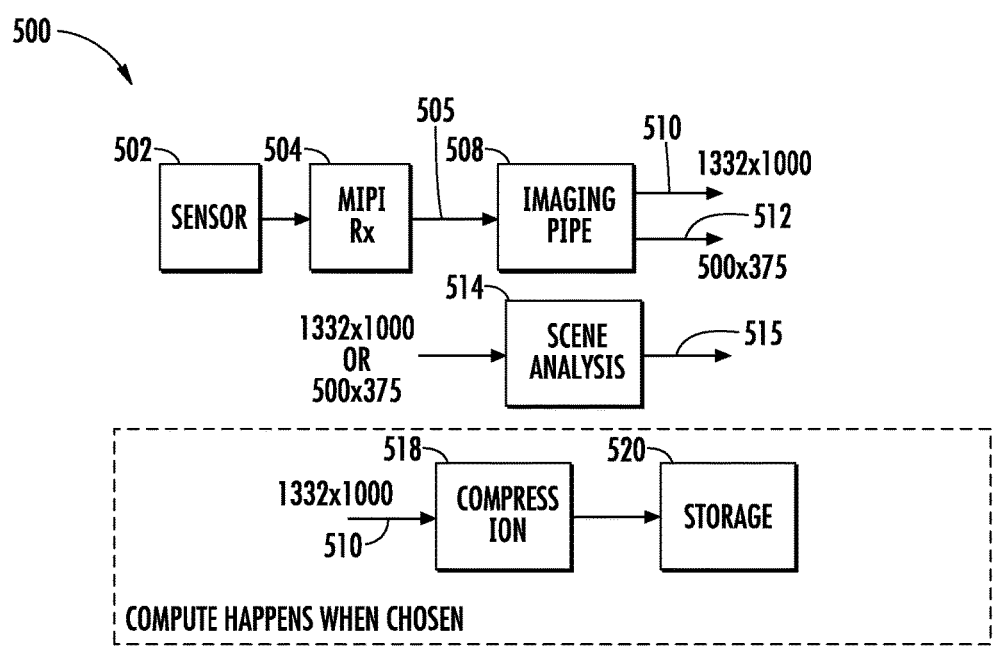
FIG. 6 depicts an example image processing framework according to example aspects of the present disclosure.

FIG. 6 depicts an example image processing framework 500 according to an example embodiment of the present disclosure. In particular, the image processing framework 500 can be employed when the mobile image capture device is operating in a low resolution capture mode.

The image processing framework 500 includes an image sensor 502, an image sensor receiver 504, and an imaging pipeline 508. In particular, in the low resolution capture mode, the image sensor 502 can provide low resolution raw image data 506.

In some implementations, the image sensor 502 performs binning and/or downsampling to result in output of low resolution raw image data 506. For example, the image sensor 502 can operate according to one or more of the following binning/sub sampling modes: 2H×2V binning; 3H×3V downsample (3×3 bin); 3H×3V downsample (bin plus skip); 2H×4V downsample; 3H×9V downsample (bin and skip); 3H×17V downsample (bin and skip). Thus, in one example, assuming a sensor array size of 4000×3000, the image sensor 502 can perform 3×3 downsampling (with binning and skipping) to output low resolution raw image data 506 which is sufficient to generate a low resolution image of 1.33 MP (1332×1000). The image sensor 502 can perform even further downsampling to provide lower resolution thumbnails for scene analysis or other objectives. Further, for sensor binning/skipping modes that have different scaling ratios between horizontal and vertical directions, the imaging pipeline 508 can perform anamorphic scaling.

The imaging pipeline 508 can stream the low resolution raw image data 506 from the image sensor receiver 504 (e.g., without the data taking a trip to memory). The imaging pipeline 508 can process the raw image data 506 to generate a low resolution image 510 (e.g., a 1.33 MP image). Alternatively or additionally, the imaging pipeline 508 can process the raw image data 506 to generate an ultra-low resolution image 512 (e.g., a 0.18 MP image).

Either or both of the image 510 and the image 512 can be provided to a scene analyzer 514. For example, in the interests of balancing analysis intelligence versus computational consumption, certain portions of the scene analyzer may analyze the image 510 while other portions analyze the image 512.

The scene analyzer 514 can analyze the inputted images and, based on such analysis, output one or more control signals 516. In particular, the control signals 516 can control whether the image 510 is compressed and stored or whether the image 510 is discarded without storage. Further, in some implementations, the control signals 516 can control the capture mode of the image capture device, or can simply increase or decrease frame rate or resolution with formally changing the capture mode. In some implementations, the scene analyzer 514 can be implemented in one or more shave cores of a system processor.

If the scene analyzer 514 indicates that the image 510 should be stored, then the image 510 is provided to an image compression component 518, where the image compression component 518 compresses the image 510. The compressed image 510 is then written to storage 520. For example, storage 520 can be a non-volatile memory.

Figure 8:
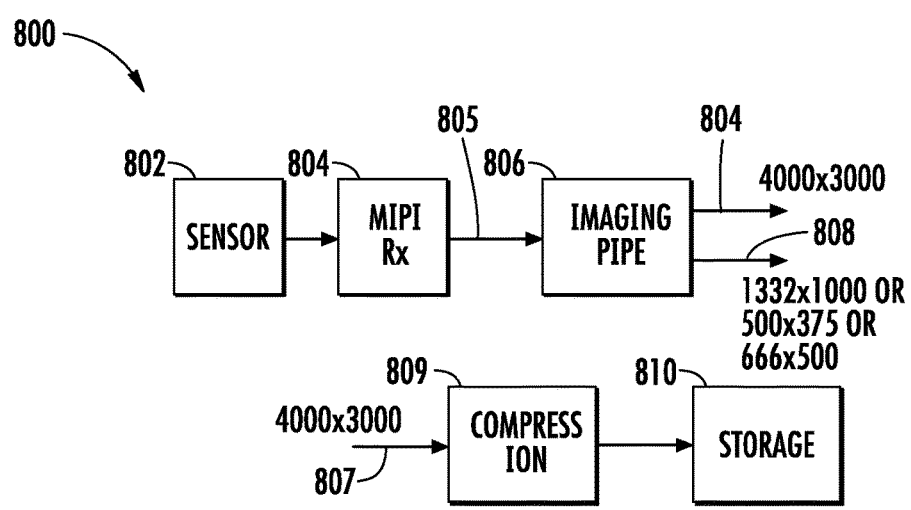
FIG. 8 depicts an example image processing framework according to example aspects of the present disclosure.

Given that the low resolution mode has a smaller number of pixels to read out and process, the power consumption in this mode is much lower. Therefore, low resolution frames can typically be run at a higher frame rate than the full resolution frames since the power consumption can be lower by performing such operations. FIG. 8 illustrates an example data flow over time in the low resolution capture mode.

Figure 7:
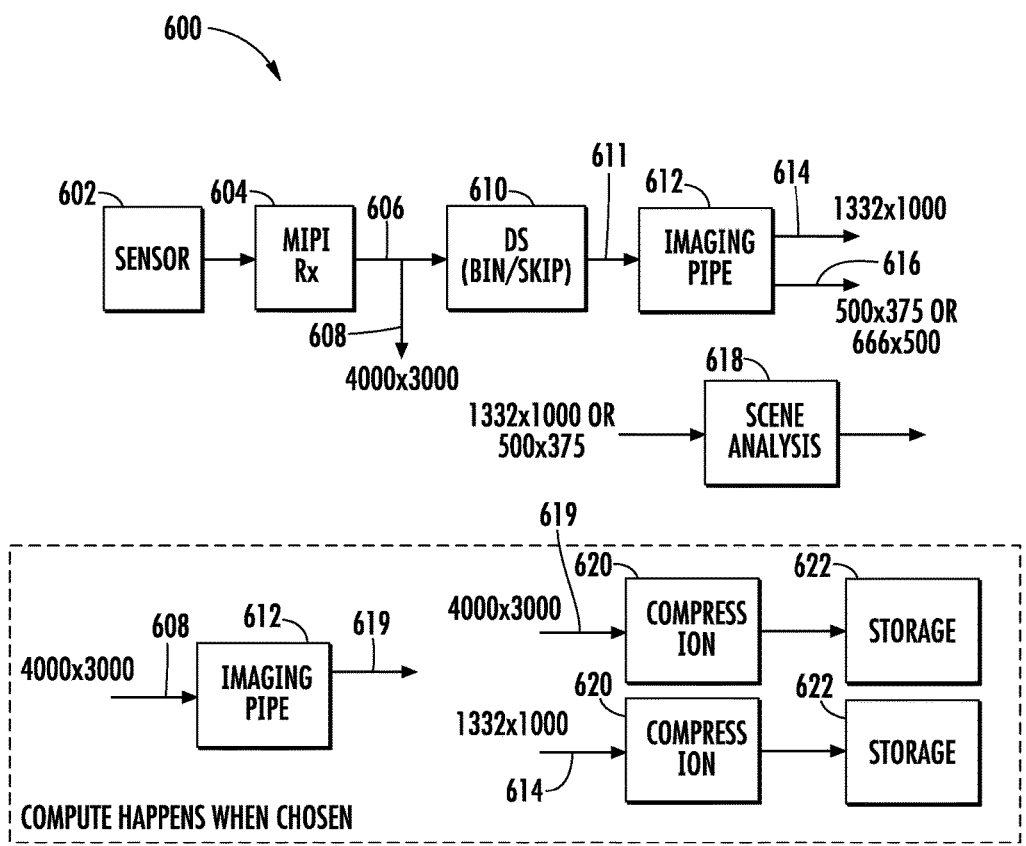
FIG. 7 depicts an example image processing framework according to example aspects of the present disclosure.

FIG. 7 depicts an example image processing framework 600 according to an example embodiment of the present disclosure. In particular, the image processing framework 600 can be employed when the mobile image capture device is operating in a high resolution capture mode.

The image processing framework 600 includes an image sensor 602, an image sensor receiver 604, a down sampler 610, and an imaging pipeline 612. In particular, in the high resolution capture mode, the image sensor 602 can provide high resolution raw image data 606. For example, the high resolution raw image data 606 can be data sufficient to generate a high resolution image of, for example, 12 MP. A copy 608 of the high resolution raw image data 606 can be temporarily stored in memory (e.g., in a temporary raw image data buffer).

The down sampler 610 can stream the high resolution raw image data 606 from the image sensor receiver 604 and can down sample the high resolution raw image data 606 to output low resolution raw image data 611. For example, the down sampler 610 can perform binning and/or skipping. The low resolution raw image data 611 can be, for example, raw image data sufficient to generate a low resolution image, such as, for example, a 1.33 MP image. The down sampler 610 can be implemented in hardware or software controlling a processor.

The imaging pipeline 612 can stream the low resolution raw image data 611 from the down sampler 610. The imaging pipeline 612 can process the low resolution raw image data 611 to generate a low resolution image 614 (e.g., a 1.33 MP image). Alternatively or additionally, the imaging pipeline 612 can process the raw image data 606 to generate one or more ultra-low resolution images 616 (e.g., a 0.18 MP image or a 0.33 MP image). One or more of the images 614 and 616 can be provided to a scene analyzer 618.

The scene analyzer 618 can analyze the inputted images and, based on such analysis, output one or more control signals. In particular, the control signals can control whether an image is generated from the high resolution raw image data 606 and then compressed and stored or whether the high resolution raw image data 606 and the images 614 and 616 are discarded without further storage. Further, in some implementations, the control signals can control the capture mode of the image capture device.

If the scene analyzer 618 indicates that the image should be stored, then the temporarily stored copy 608 of the high resolution raw image data 606 is provided to the imaging pipeline 612. For example, the copy 608 of the high resolution raw image data 606 can be retrieved from a temporary raw image data buffer and processed in a memory to memory fashion. The imaging pipeline 612 can process the high resolution raw image data 606 to generate a high resolution image 619. For example, the high resolution image 619 can be a 12 MP image.

The high resolution image 619 is then provided to an image compression component 620, where the image compression component 620 compresses the image 619. The compressed image 619 is then written to storage 622. For example, storage 622 can be a non-volatile memory.

In some implementations, the low resolution image 614 can also be provided to the image compression component 620, where the image compression component 620 compresses the image 619. The compressed image 614 is then written to storage 622. For example, storage 622 can be a non-volatile memory.

FIG. 8 depicts an example image processing framework 800 according to an example embodiment of the present disclosure. In particular, the image processing framework 800 can be employed when the mobile image capture device is operating in a burst capture mode.

The image processing framework 800 includes an image sensor 802, an image sensor receiver 804, and an imaging pipeline 806. In particular, in the high resolution capture mode, the image sensor 802 can provide high resolution raw image data 805.

The imaging pipeline 806 can stream the high resolution raw image data 805 from the image sensor receiver 804 (e.g., without the data taking a trip to memory). The imaging pipeline 806 can process the raw image data 805 to generate a high resolution image 807 (e.g., a 12 MP image). Alternatively or additionally, the imaging pipeline 806 can process the raw image data 805 to generate a various lower resolution images 808.

The image 807 is then provided to an image compression component 809, where the image compression component 809 compresses the image 807. The compressed image 807 is then written to storage 810. For example, storage 810 can be a non-volatile memory. In some implementations, compression is performed in-stream, which eliminates the power requirements of temporarily writing to memory.

Unlike frameworks 500 and 600, the framework 800 of the burst capture mode may not provide the image 807 to a scene analyzer to make keep/discard decisions. Instead, the image 807 (and optionally any number of images 808) is simply compressed and stored. In particular, since burst capture is typically performed after the device has detected (e.g., from previous frames) that an interesting scene is available, intensive image analysis may not be necessary to perform. This allows the device to devote most of the energy and computing power to performing the imaging pipeline and compression.

However, in some implementations, the mobile image capture device may have sufficient resources to perform scene analysis during burst capture mode for the purpose of keep/discard decisions. This may also be enabled by lowering the resolution and/or frame rate requirements/parameter values of the burst image capture.

In some implementations, burst capture can be performed to obtain a plurality of image frames in a video stream. For example, the plurality of image frames can be captured concurrently with an associated audio signal. In some implementations, the plurality of image frames in a burst capture can be stored for analysis at a later time, such as to generate an edited video, as described herein.

Figure 9:
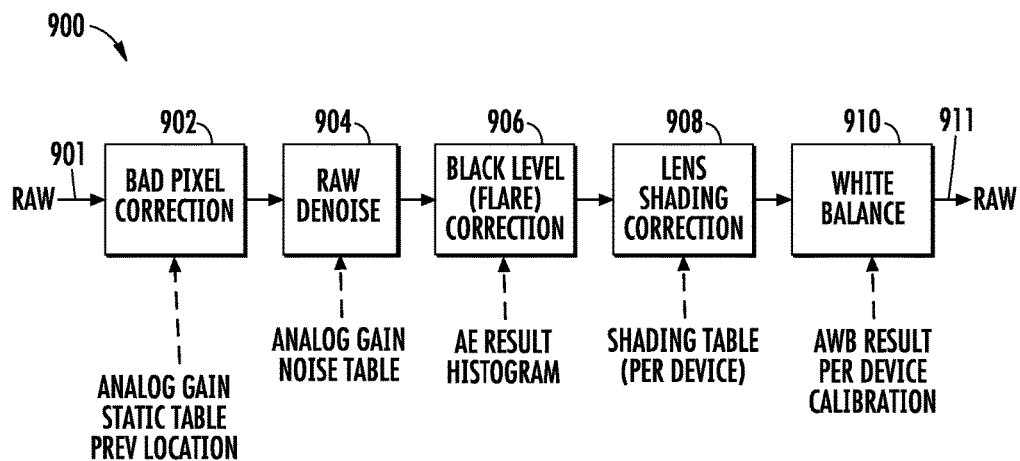
FIG. 9 depicts an example image pipeline according to example aspects of the present disclosure.
Figure 10:
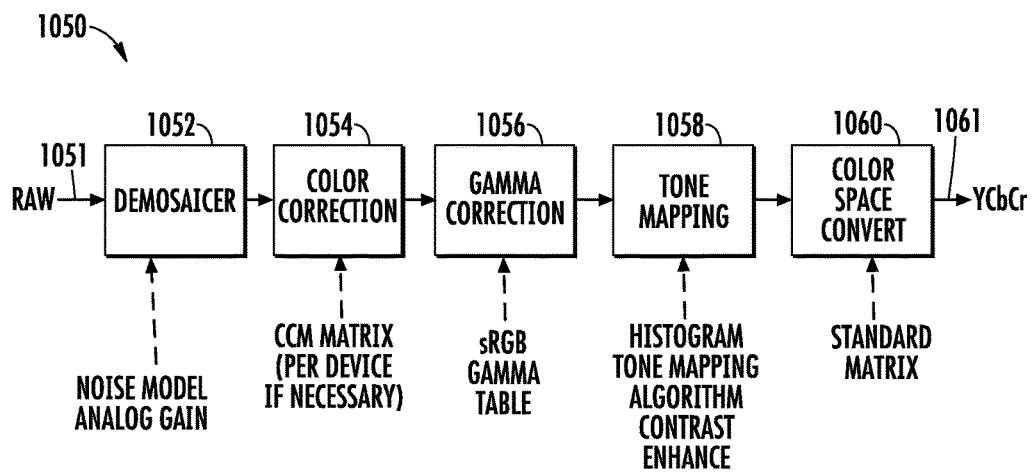
FIG. 10 depicts an example image pipeline according to example aspects of the present disclosure.

FIGS. 9 and 10 depict example imaging pipeline(s) 900 and 1050 according to an example embodiment of the present disclosure. The pipelines 900 and 1050 can be separate pipelines or can be combined to form a single pipeline.

The imaging pipeline included in an image capture device can impact the quality of images generated by the image capture device. The imaging pipeline can take raw image data from an image sensor and performs the necessary processing to reduce image defects and non-idealities of the image sensor and optics in the imaging system, thereby producing high quality images that are pleasing to view. Given that the power consumption of a mobile image capture device is typically constrained, many of the computations of the imaging pipeline can be performed in hardware blocks, which are more efficient that software implementations.

Referring first to FIG. 9, imaging pipeline 900 depicts one example imaging pipeline that performs a raw-to-raw Bayer pipeline. RAW Bayer image data 901 is either streamed directly from the image sensor, or is read from memory. Streaming directly from the sensor is desirable in order to save power consumption and reduce memory bandwidth. A first step is to remove the bad pixels at block 902. This requires knowledge of analog gain applied in the sensor and a static defect table. Previous x-y coordinates of bad pixels are optional and may help the bad pixel correction.

Next, at block 904, raw pixel may be denoised lightly. One benefit of such a raw-denoise block 904 is to remove some noise such that it does not crease maze-like artifacts during a demosaicing state. Again, analog gain applied to the sensor and noise table that has been calibrated for the sensor is useful for improved performance.

At block 906, black level (pedestal) can be removed. A histogram of pixel intensities is useful to remove the black level. Optionally, flare correction may be performed at a separate block after white balancing at the expense of additional processing.

Lens shading correction can be performed at block 908. Lens shading correction can be applied by obtaining a calibrated per-device shading table. This table can be obtained during calibration. At block 910, white balance gains can be applied using the AWB result. In addition, per device calibration results of small color ratios can be applied if applicable.

With reference now to FIG. 10, pipeline 1050 is an RGB/YCbCr pipeline. RAW Bayer image data 1051 is passed onto a demosaicer block 1052 which is then used to perform interpolation on missing color components. For example, on an "R" pixel, the demosaicing block 1052 computes optimal "G" and "B" pixels such that a very good sharpness can be maintained without unnatural sharpening artifacts. This goes through a series of transformations (e.g., blocks 1054 and 1056) such that the pixel values are in sRGB space (or any other color space).

Optional tone mapping can be performed at block 1058 such that contrast in enhanced or dynamic range is compressed such that it may be rendered on lower bit-depth displays. Next, color space conversion can be performed at block 1060 such that the pixel values 1061 are in YCbCr pixel domain.

Once the pixel values 1061 are in YCbCr domain, it may be passed onto a still image (e.g., JPEG or other formats) compression block. Note that denoising and sharpening can be performed on the luminance channel. In addition, chrominance noise can be significantly suppressed especially for low-light images. Additional blocks such as special effects can be optionally applied, as well.

Figure 11:
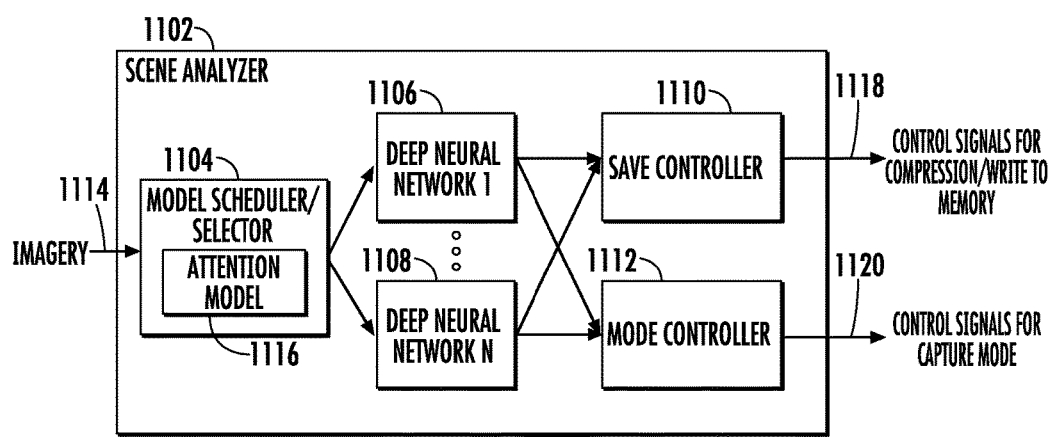
FIG. 11 depicts an example scene analyzer according to example aspects of the present disclosure.

FIG. 11 depicts an example scene analyzer 1102 according to an example embodiment of the present disclosure. The scene analyzer 1102 includes a model scheduler/selector 1104; a plurality of machine-learned models that analyze characteristics of input images; a save controller 1110; and a mode controller 1112. In some implementations, the plurality of models are a plurality of deep neural networks (e.g., deep neural networks 1106 and 1108), or other multi-layer non-linear models. In some implementations, save controller 1110 and mode controller 1112 can be implemented as the same component (e.g., a "save and mode controller").

The scene analyzer 1102 can receive one or more images 1114. The scene analyzer 1114 can analyze each receive image 1114 and, based at least in part on such analysis, output one or more control signals 1118 and 1120. In particular, the control signals 1118 can control whether the one or more images 1114 are compressed and written to memory (e.g., a non-volatile memory). The control signals 1120 can control the capture mode of the image sensor or mobile image capture device as a whole.

The received imagery 1114 can include high resolution images and/or low resolution images. In some implementations, certain portions of scene analyzer 1102 can analyze low resolution versions of an image 1114 while other portions (e.g., portions which analyze facial features) analyze cropped portions of high resolution versions of the image 1114.

The model scheduler 1104 can control which models (if any) an image is input for scene analysis. The model selector 1104 can select which models to employ depending on a number of criteria including computational consumption considerations, energy consumption considerations, and/or the results of an initial analysis of the scene of the image. As one example, the model selector 1104 can simply implement a predefined schedule or can implement some defined logic regarding an ordering or configuration of models to employ. As another example, the model selector 1104 may itself be a model (e.g., neural network), such as a multi-layer non-linear model (e.g., deep neural network).

In some implementations, the model selector 1104 includes an attention model 1116 that analyzes only a portion of an input image. The attention model 1116 can output an indication of whether each input image should be input into at least one of the downstream models for further scene analysis. Thus, the attention model 1116 can operate as a prefilter to the downstream models (e.g., deep neural networks 1106 and 1108) included in the scene analyzer 1102.

As one example, the attention model 1116 can be a recurrent deep neural network that tracks a face through a succession of images 1114 and outputs a probability that each analyzed image depicts the face experiencing joy. The attention model 1116 can also output a description of which portion of the next input image the attention model 1116 should analyze. In some implementations, a supervised objective function informs the attention model 1116 what is valuable to pay attention to.

Use of an attention model 1116 in this fashion can greatly reduce the energy consumption of the mobile image capture device since the attention model 1116, which limits its analysis to only a portion of the images, guards certain downstream models (e.g., deep neural networks 1106 and 1108) which may analyze the image in its entirety and/or require larger computational expenditure.

In other implementations, the attention model 1116 can be used in place of the other models (e.g., models 1106 and 1108) to guide image storage and/or capture mode decisions. In yet further implementations, one or more of the various deep neural networks (e.g., 1106 and 1108) can be replaced with an attention model version of such network.

The scene analyzer 1102 can further include any number of machine-learned models (e.g., deep neural networks 1106 and 1108) which analyze the scene depicted by an input image 1114 and output various descriptors (e.g., annotations) that describe a desirability of the scene of the input image 1114 (e.g., describe various image characteristics which impact the desirability of the scene). The scene analyzer 1102 can make intelligent decisions regarding image storage and/or capture mode on the basis of such descriptors. The neural networks can be convolutional neural networks, recurrent neural networks, feed forward neural networks, or combinations thereof.

In particular, the save controller 1110 can take as input all of the annotations from the models and use such annotations to decide whether or not to compress and store the image. Likewise, the mode controller 1112 can determine whether to change the capture mode of the mobile image capture device on the basis of such annotations.

In some implementations, the save controller 1110 and/or the mode controller 1112 can include one or more decision trees, models, and/or algorithms that apply some hand-crafted logic. Each of the save controller 1110 and the mode controller 1112 can include computer logic utilized to provide desired functionality. Thus, each of the save controller 1110 and the mode controller 1112 can be implemented in hardware, firmware and/or software controlling a general purpose processor. In some implementations, each of the save controller 1110 and the mode controller 1112 includes program code files stored on the storage device, loaded into a memory and executed by a processor or can be provided from computer program products, for example, computer executable instructions that are stored in a tangible computer-readable storage medium such as, for example, a RAM disk or card or other computer-readable optical or magnetic media.

In some implementations, the scene analyzer 1102 is implemented asynchronously with the capture of images 1114. Stated differently, in some implementations, the frame rate of image capture is (at least in some instances) different that the frequency at which the scene analyzer 1102 analyzes images 1114. Moreover, in some implementations, only certain images 1114 are analyzed, such as images associated with one or more audio classifier labels.

In some implementations, in addition to receiving imagery 1114 as input, the scene analyzer 1102 can also receive additional lower dimensional data such as capture parameters or IMU data. For example, IMU data can indicate a relative amount of motion there is during image capture. Analysis of walking frequency may allow the mobile image capture device to time the "right" capture instant as the user walks. Capture parameters such as exposure time can also be adjusted accordingly.

Low level analysis can also be performed in order to determine whether to perform multi-frame capture to enhance quality. For example, if the exposure values are very low and high motion blur or high amounts of noise are expected, the mobile image capture device can capture burst for quality enhancement. Multi-frame denoising can then be performed in either the mobile image capture device or the user computing device.

Figure 12:
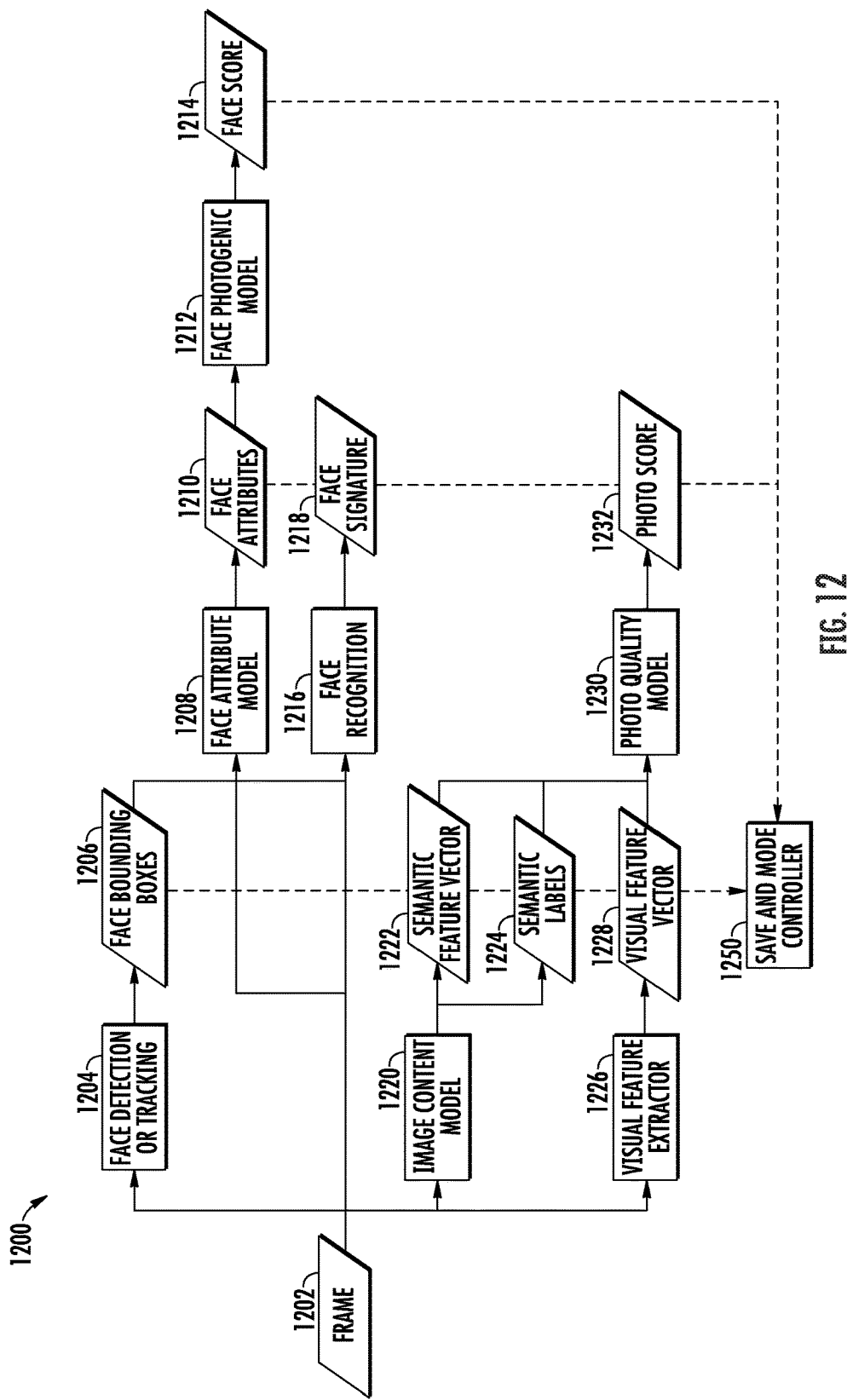
FIG. 12 depicts an example configuration of models in a scene analyzer according to example aspects of the present disclosure.

FIG. 12 depicts an example configuration 1200 of models in a scene analyzer according to an example embodiment of the present disclosure. In particular, FIG. 12 depicts different components operating in the scene analyzer and the data flow between them. As illustrated, certain portions of the execution can be parallelized.

In addition, the following discussion with reference to FIG. 12 will refer to various machine-learned models. In some implementations, one or more (e.g., all) of such models are deep neural networks. Each model can output at least one descriptor that describes a characteristic of the image. The image can be annotated with such descriptor(s). Thus, the outputs of the models will be referred to as annotations. In some implementations, the models provide the annotations to a save and mode controller 1250 which annotates the image with the annotations.

The configuration 1200 receives as input a frame of imagery 1202. For example, the frame 1202 may have been selected by a model scheduler for analysis.

The frame of imagery 1202 is provided to a face detection or tracking model 1204. The face detection or tracking model 1204 detects one or more faces depicted by the frame 1202 and outputs one or more face bounding boxes 1206 that describe the respective locations of the one or more detected faces. The face bounding boxes 1206 can be annotated to the frame 1202 and can also be provided as input alongside the frame 1202 to a face attribute model 1208 and a face recognition model 1216.

In some implementations, the face detection or tracking model 1204 performs face tracking rather than simple face detection. In some implementations, the model 1204 may choose which of detection or tracking to perform. Face tracking is a faster alternative to face detection. Face tracking can take as additional inputs the face detection bounding boxes 1206 from a previous frame of imagery. The face tracking model 1204 updates the position of the bounding boxes 1206, but does not detect new faces.

Importantly, neither face detection nor face tracking attempt to determine or ascertain a human identity of any of the detected faces. Instead, the face detection or tracking model 1204 simply outputs face bounding boxes 1206 that describe the location of faces within the frame of imagery 1202. Thus, the model 1204 performs only raw detection of a face (e.g., recognition of depicted image features that are "face-like"), without any attempt to match the face with an identity.

The face attribute model 1208 can receive as input one or more crops of the frame of imagery 1202 (e.g., relatively higher resolution crops), where the one or more crops correspond to the portion(s) of the frame 1202 defined by the coordinates of the bounding box(es) 1206. The face attribute model 1208 can output an indication (e.g., a probability) that the detected face(s) include certain face attributes 1210. For example, the face attribute model 1208 can output respective probabilities that the detected faces include smiles, open eyes, certain poses, certain expressions, a diversity of expression, or other face attributes 1210.

The face attributes 1210 can be provided as input alongside the frame of imagery 1202 to a face photogenic model 1212. The face photogenic model 1212 can output a single face score 1214 which represents a level of photogenicness of a pose, an expression, and/or other characteristics or attributes of the detected face(s).

Returning to the output of face detection or tracking model 1204, the face recognition model 1216 can receive as input one or more crops of the frame of imagery 1202 (e.g., relatively higher resolution crops), where the one or more crops correspond to the portion(s) of the frame 1202 defined by the coordinates of the bounding box(es) 1206. The face recognition model 1216 can output a face signature for each of the detected faces. The face signature can be an abstraction of the face such as an embedding or template of the face or features of the face.

Importantly, the face recognition model 1216 does not attempt to determine or ascertain a human identity of the detected face(s). Thus, the face recognition model 1216 does not attempt to determine a name for the face or otherwise match the face to public profiles or other such information. Instead, the face recognition model 1216 simply matches an abstraction of the detected face(s) (e.g., an embedding or other low-dimensional representation) to respective other abstractions associated with previously "recognized" faces. As one example, the face recognition model 1216 may provide a probability (e.g., a level of confidence from 0.0 to 1.0) that an abstraction of a face depicted in an input image matches an abstraction of a face depicted in a previously captured image. Thus, the face recognition model 1216 may indicate (e.g., in the face signature 1218) that a face detected in the image 1202 is likely also depicted in a previously captured image, but does not attempt to identify "who" this face belongs to in the human identity contextual sense. Similarly, the face recognition model 1216 may provide a probability that an abstraction of a face depicted in an input image matches an abstraction of a face that has been previously indicated as having a heightened importance to the user of the mobile image capture device. Thus, the face recognition model 1216 may indicate that a face detected in the image 1202 is likely also included in the set of faces that the user has indicated as having heightened performance, but does not attempt to identify "who" this face belongs to in the human identity contextual sense.

The frame of imagery 1202 can also be provided as input to an image content model 1220. The image content model 1220 can output one or more semantic feature vectors 1222 and one or more semantic labels 1224. The semantic feature vectors 1222 can be used for determining that two images contain similar content (e.g., similar to how face embeddings are used to determine that two faces are similar). The semantic labels 1224 can identify one or more semantic features (e.g., "dog," "sunset," "mountains," "Eiffel Tower," etc.) detected within the frame of imagery 1202. The notion of similarity between images can be used to ensure a diversity of captured images.

In some implementations, the semantic labels 1224 can be used to generate an ambient soundtrack in an edited video. For example, in some implementations, the semantic labels 1224 (also referred to as image labels) can identify semantic features which correspond to or are otherwise associated with one or more audio classifier labels. For example, a semantic label 1224 can indicate a frame of imagery 1202 includes one or more waves crashing on a beach. In some implementations, a portion of audio which includes an associated audio classifier label (e.g., waves) can be selected for inclusion in an ambient soundtrack based at least in part on the associated semantic label 1224 from the frame of imagery 1202.

In some implementations, the image content model 1220 is a version of a deep convolutional neural network trained for image classification. In some implementations, a subset of semantic classes that are particularly important to users of the mobile image capture device (e.g., animals, dogs, cats, sunsets, birthday cakes, etc.) can be established and the image content model 1220 can provide a particular emphasis on detection/classification with respect to such subset of semantic classes having elevated importance.

The frame of imagery 1202 can also be provided as input to a visual feature extractor model 1226. The visual feature extractor model 1226 can output one or more visual feature vectors 1228 that describe one or more visual features (e.g., a color histogram, color combinations, an indication of amount of blur, an indication of lighting quality, etc.) of the frame 1202.

The semantic feature vectors 1222, semantic labels 1224, and the visual feature vectors 1228 can be provided as input alongside the frame 1202 to a photo quality model 1230. The photo quality model 1230 can output a photo quality score 1232 based on the inputs. In general, the photo quality model 1230 will determine the photo quality score 1232 on the basis of an interestingness of the image 1202 (e.g., as indicated by the semantic labels 1224), a technical quality of the image 1202 (e.g., as indicated by visual feature vectors 1228 that describe blur and/or lighting), and/or a composition quality of the image 1202 (e.g., as indicated by the relative locations of semantic entities and visual features).

The save and mode controller 1250 will take as input all of the annotations 1206, 1210, 1214, 1218, 1222, 1224, 1228, and 1232 and make a decision whether or not to save the frame of imagery 1202 or a high resolution version thereof and also whether or not to change a capture mode of the device. In some implementations, the save controller 1250 will try to save frames that the final curation function (e.g., the transfer controller and/or best shot selector) will want to select, and hence can be viewed as an online/real-time approximation to such curation function.

In some implementations, the save and mode controller 1250 includes an in-memory annotation index or other frame buffering so that save and mode decisions regarding frame 1202 can be made relative to peer images. In other implementations, the save and mode controller 1250 makes decisions based only on information about the current frame 1202.

In some implementations, and to provide an example only, the save and mode controller 1250 may be designed so that approximately 5% of captured images are selected for compression and storage. In some implementations, whenever the save and mode controller 1250 triggers storage of an image, some window of imagery around the image which triggered storage will be stored.

In some implementations, various ones of the models can be combined to form a multi-headed model. As one example, the face attribute model 1208, the face recognition model 1216, and/or the face photogenic model 1212 can be merged or otherwise combined to form a multi-headed model that receives a single set of inputs and provides multiple outputs.

Configuration 1200 is provided as one example configuration only. Many other configurations of models that are different than configuration 1200 can be used by the scene analyzer. In particular, in some implementations, a model scheduler/selector of the scene analyzer can dynamically reconfigure the configuration of models to which an image is provided as input.

Referring now to FIGS. 13 and 14, a visual representation of an example framework 1300 for generating an edited video, and more particularly, a shortened video, including an ambient soundtrack according to example aspects of the present disclosure is depicted. In the visual representation 1300, vertical bars are representative of captured image frames. For example, in some implementations, an image capture device can be configured to obtain a video stream comprising a plurality of sequential image frames and an associated audio signal. For example, the audio signal can be captured concurrently with the plurality of sequential image frames. In some implementations, the image frames can be captured by a mobile image capture device, such as in a burst mode or other "video" capture mode in which a plurality of sequential image frames are obtained. For example, in some implementations, a mobile image capture device can capture the plurality of sequential image frames at a rate of 15-30 frames per second.

As depicted in FIG. 13, a video stream can include a plurality of sequential image frames 1310 and an associated audio signal 1320. For example, in some implementations, the plurality of sequential image frames 1310 can be captured by an image sensor of an image capture device, and the associated audio signal 1320 can be captured by an audio sensor of the image capture device. For example, the audio signal 1320 can be captured concurrently with the plurality of sequential image frames 1310. The plurality of sequential image frames 1310 and/or the associated audio signal 1320 can be processed, converted, maintained and/or stored in various data formats, as disclosed herein.

According to example aspects of the present disclosure, an edited video including an ambient soundtrack can be generated by one or more computing devices, such as an image capture device, a user computing device, or both. The edited video can include at least a subset of the plurality of sequential image frames, and an ambient soundtrack.

For example, the audio signal 1320 can be analyzed by a machine-learned audio classifier model. In some implementations, the machine-learned audio classifier model can be included in or otherwise a part of an image capture device, as disclosed herein. The machine-learned audio classifier model can determine one or more audio classifier labels associated with one or more portions of the audio signal 1320. For example, various portions of the audio signal 1320 can be labeled with audio classifier labels descriptive of various audio events associated with the respective audio portions.

For example, in some implementations, the machine-learned audio classifier can classify ambient sounds, such as non-speech sounds. As examples, such sounds can include environmental sounds, such as waves, wind, rain, thunder, leaves rustling, etc.; animal sounds, such as birds chirping, insects chirping, or other animal sounds; human activity noises, such as vehicle traffic, clapping, footsteps, chatter, restaurant din, laughing, crying, etc.; and/or other sounds. The machine-learned audio classifier model can be configured to analyze the audio signal 1320 and determine one or more audio classifier labels for one or more portions of the audio signal. Different audio portions can be labeled with their respective audio classifier labels. For example, the first audio portion 1322 can be include one or more ambient sounds labelled with a first audio classifier label, and a second audio portion 1324 can include one or more ambient sounds labeled with a second audio classifier label. Other portions of the audio signal 1320 can similarly be labeled with a respective audio classifier labels, such as ambient sound labels and/or foreground sound labels.

Additionally, in some implementations, the machine-learned audio classifier can classify certain foreground sounds. As examples, such sounds can include human speech, crashes, bangs, bells, whistles, horns, sirens, and/or other sounds. Audio portions including such foreground sounds can be labeled with respective audio classifier labels.

According to example aspects of the present disclosure, an ambient soundtrack can be generated by selecting for inclusion in the ambient soundtrack portions of the audio signal 1320 that have audio classifier labels associated with ambient sound. Further, portions of the audio signal 1320 that have audio classifier labels associated with foreground sound can be rejected. For example, the first audio portion 1322 and the second audio portion 1324 can be selected for inclusion in an ambient soundtrack.

In some implementations, the one or more audio portions can be selected for inclusion by a machine-learned model trained to generate the ambient soundtrack and/or the shortened image stream.

In some implementations, the first audio portion 1322 and/or the second audio portion 1324 can be selected for inclusion based at least in part on an audio selection input descriptive of one or more audio classifier labels received from a user. For example, as will be discussed in greater detail with reference to FIG. 18, in some implementations, a user can provide one or more audio selection inputs via a user interface.

Additionally, an image stream can be generated that includes at least a subset of the plurality of sequential image frames 1310. For example, in some implementations, the plurality of sequential image frames 1310 can be analyzed by one or more machine-learned models configured to determine a desirability of a scene depicted by the image frames, such as via a scene analyzer of an image capture device. In some implementations, various subsets of sequential image frames can be labeled with one or more image labels (semantic labels). For example, a first subset of sequential image frames 1312 can be labeled with a first image label, and a second subset of sequential image frames 1314 can be labeled with a second image label. In some implementations, one or more subsets of sequential image frames can be selected for inclusion based on the desirability of the scene depicted by the subset.

In some implementations, the first audio portion 1322 and/or the second audio portion 1324 can be selected for inclusion based at least in part on one or more image labels associated with a subset of sequential image frames selected for inclusion in an image stream. For example, at least a subset of the plurality of sequential image frames 1310 can be analyzed to determine one or more image labels descriptive of a scene, and the ambient soundtrack can be generated based at least in part on the one or more image labels. For example, a first subset of sequential image frames 1312 can include a beach scene with waves crashing on a beach, and a first audio portion 1322 may include an associated audio classifier label, such as waves. In some implementations, the first audio portion 1322 can be selected for inclusion based at least in part on one or more image labels associated with the first subset of sequential image frames 1312.

In some implementations, one or more subsets of sequential image frames can be selected for inclusion in an image stream based at least in part on a user input. For example, in some implementations, a user can select one or more portions of a video stream for inclusion in the edited video. Additionally, in some implementations, a user can select a video length and/or a type of video to be generated, such as via a user interface, as will be described in greater detail with respect to FIG. 17.

In some implementations, the image stream can be generated by selecting a first subset of sequential image frames 1312, selecting a second subset of sequential image frames 1312, and generating a shortened image stream 1410 including both the first subset of sequential image frames 1312 and the second subset of sequential image frames 1314 arranged consecutively. For example, as depicted in FIG. 14, the shortened image stream 1410 can include the first subset of sequential image frames 1312 and the second subset of sequential image frames 1314 arranged consecutively.

In some implementations, the ambient soundtrack can be generated by combining the first audio portion 1322 and the second audio portion 1324. For example, the ambient soundtrack can be generated by arranging the first audio portion 1322 and the second audio portion 1324 to be played consecutively. In some implementations, one or more transition effects, such as cross-fading, can be used to transition from the first audio portion 1322 to the second audio portion 1322 in the ambient soundtrack. For example, as depicted in FIG. 14, an ambient soundtrack 1420 can be generated by including the first audio portion 1322 and the second audio portion 1324 to be played consecutively. In some implementations, an ambient soundtrack may include only a single audio portion. In other implementations, an ambient soundtrack can include any number of audio portions.

By combining the shortened image stream 1410 and the ambient soundtrack 1420, an edited video can be generated. For example, the shortened image stream 1410 and the ambient soundtrack 1420 can be combined in a single data file, and can be configured to play concurrently.

Importantly, the one or more audio portions selected for inclusion in an ambient soundtrack 1420 need not be audio portions which were captured concurrently with one or more subsets of sequential image frames selected for inclusion in a shortened image stream 1410. For example, an audio portion captured concurrently with the first subset of sequential image frames 1312 may include certain foreground sounds, such as human speech. According to example aspects of the present disclosure, such foreground sounds can be rejected for inclusion in the ambient soundtrack 1420. In this way, these foreground sounds, such as harsh sounds and/or human speech which may distract from the overall "feel" of an experience can be excluded, and only ambient sounds which capture the feel or essence can be included. Further, the privacy of bystanders can be maintained by specifically rejecting and discarding human speech sounds.

Referring now to FIGS. 15 and 16, a visual representation of another example framework 1500 for generating an edited video, and more particularly, a hyper-lapse video, according to example aspects of the present disclosure is depicted. In the visual representation 1500, vertical bars are representative of captured images, with horizontally thicker bars denoting images selected for inclusion in a hyper-lapse image stream. Similar to the framework 1300, a video stream can include a plurality of sequential image frames 1510 and an associated audio signal 1520.

As with the framework 1300, the audio signal 1520 can be analyzed to classify various portions with respective audio classifier labels. Similarly, one or more audio portions, such as a first audio portion 1522 can be selected for inclusion in an ambient soundtrack. The one or more portions, such as a first audio portion 1522, can be selected for inclusion in an ambient soundtrack based on user input, image analysis, to exclude certain foreground sounds, or other selection processes, as disclosed herein. For example, as depicted in FIG. 16, an ambient soundtrack 1620 can include the first audio portion 1522.

However, in some implementations, an image stream of an edited video can include a plurality of non-sequential image frames. For example, the plurality of sequential image frames 1510 can include sequential image frames captured at a particular frame rate, such as 15 frames per second. However, in some implementations, only certain of the image frames can be selected for inclusion in an image stream of an edited video. For example, in some implementations, a plurality of non-sequential image frames can be selected for inclusion, such as according to a particular pattern. For example, as shown in FIG. 15, every fifth image frame, represented by a thicker, bold line, can be selected for inclusion. The selected non-sequential image frames can then be combined, such as arranged consecutively, to generate the image stream. For example, as depicted in FIG. 16, the plurality of non-sequential image frames can be arranged consecutively and combined with the ambient soundtrack 1620 to generate an edited video comprising a hyper-lapse image stream 1610 and an ambient soundtrack 1620.

In some implementations, the plurality of non-sequential image frames can be selected based at least in part on an image analysis. For example, rather than selecting individual image frames according to a particular pattern, the plurality of sequential image frames 1510 can be analyzed, and a plurality of non-sequential image frames can be selected in order to generate a smooth hyper-lapse image stream. For example, individual image frames can be selected based on their individual characteristics in order to generate the smooth hyper-lapse image stream. In some implementations, individual image frames can be selected based on other characteristics, such as GPS data, in order to generate a smooth hyper-lapse image stream, as disclosed herein. In this way, a hyper-lapse image stream 1610 can be generated and combined with an ambient soundtrack 1620 to generate an edited video.

In some implementations, a plurality of sequential image frames can be captured in a hyper-lapse capture mode. For example, an image capture device can be configured in a hyper-lapse capture mode wherein individual image frames are captured based on an image analysis, GPS, or other input. According to additional example aspects of the present disclosure, in some implementations, a plurality of sequential image frames captured in a hyper-lapse mode (or a subset thereof) can be combined with an ambient soundtrack, as described herein. For example, one or more audio portions can be selected for inclusion in the ambient soundtrack, and can be combined with the plurality of sequential image captured in the hyper-lapse mode to generate a hyper-lapse video including an ambient soundtrack.

Referring generally to FIGS. 13-16, in some implementations, the edited video can be generated by an image capture device. In some implementations, portions of the edited video, such as an ambient soundtrack or portions thereof, can be generated by the image capture device. For example, portions of the audio signal 1320/1520 which include human speech or other foreground sounds can be discarded, and only portions including ambient sounds may be stored in a non-volatile memory or transferred from the image capture device. As noted, in some implementations, user input can be received via a user computing device, and the edited video can be generated by the image capture device based at least in part on the user input. For example, an audio input selection descriptive of one or more selected audio classifier labels can be received via a user computing device, and the image capture device can generate the ambient soundtrack by selecting one or more audio portions with the selected audio classifier labels for inclusion in an ambient soundtrack.

Figure 17:
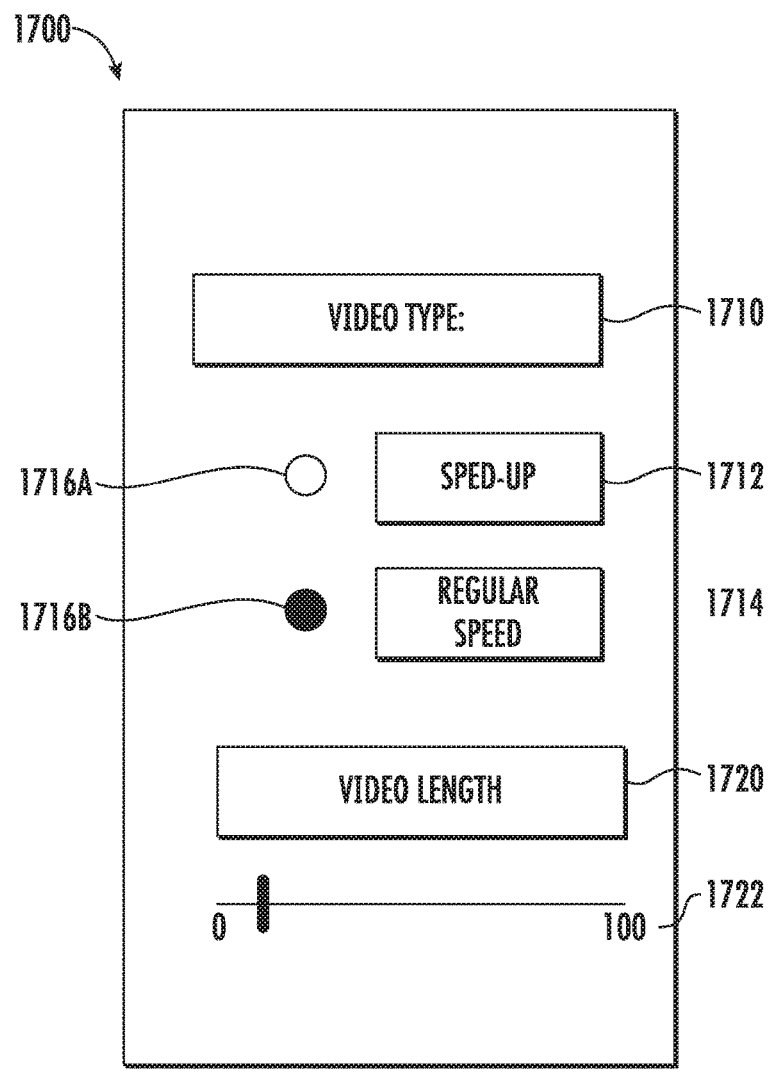
FIG. 17 depicts an example user interface to obtain user input according to example aspects of the present disclosure.

FIG. 17 depicts an example user interface 1700 for obtaining user input which can be used to generate an edited video. User interface 1700 depicts just one example user interface for obtaining user input. Other suitable user interfaces can similarly be used. In some implementations, user interface 1700 can be displayed on a personal computing device, such as a smart phone, laptop, or other personal computing device. In some implementations, user input received via a user interface 1700 can be provided to an image capture device, such as a mobile image capture device, and an edited video can be generated based at least in part on the user input received via of the user interface 1700.

As depicted in FIG. 17, in some implementations, a user can select a video type 1710. For example, in some implementations, a user can select a sped-up video 1712. The sped-up video 1712 can be, for example, a video generated by selecting a plurality of non-sequential image frames and arranging the image frames consecutively to generate a hyper-lapse image stream. In some implementations, the user can select the sped-up 1712 option by clicking, pushing, or otherwise selecting a radio button 1716A associated with the sped-up option 1712. Similarly, checkboxes or other input options can be used in a user interface 1700.

In some implementations, the user can select a regular speed video 1714. For example, the regular speed video 1714 option can be used to generate an edited video including a shortened image stream including one or more subsets of sequential image frames, as disclosed herein. In some implementations, the user can select the regular speed 1714 option by clicking, pushing, or otherwise selecting a radio button 1716B associated with the regular speed option 1714. In some implementations, the sped-up option 1712 and the regular speed option 1714 can be mutually exclusive, such that only one option may be selected at a time.

The user interface 1700 can also include a video length input 1720. For example, in some implementations, a slider bar 1722 can be used to select a video link. In some implementations as shown in FIG. 17 the video length can be depicted as a percentage (e.g., 0% on one end of the slider bar and 100% on the opposite end of the slider bar). In other implementations, a slider bar can show a total length of a selected video, and a user can move the slider bar to select how long an edited video should be (e.g., 30 seconds of a 10 minute video). Other video length input options can similarly be used in a user interface 1700.

In some implementations, a user interface 1700 can include other options and/or other user interfaces can be used, such as for videos captured in a hyper-lapse mode. For example, for a video captured in a hyper-lapse mode, a video type 1710 input option may not be provided, whereas a video length 1720 option may be provided.

Figure 18:
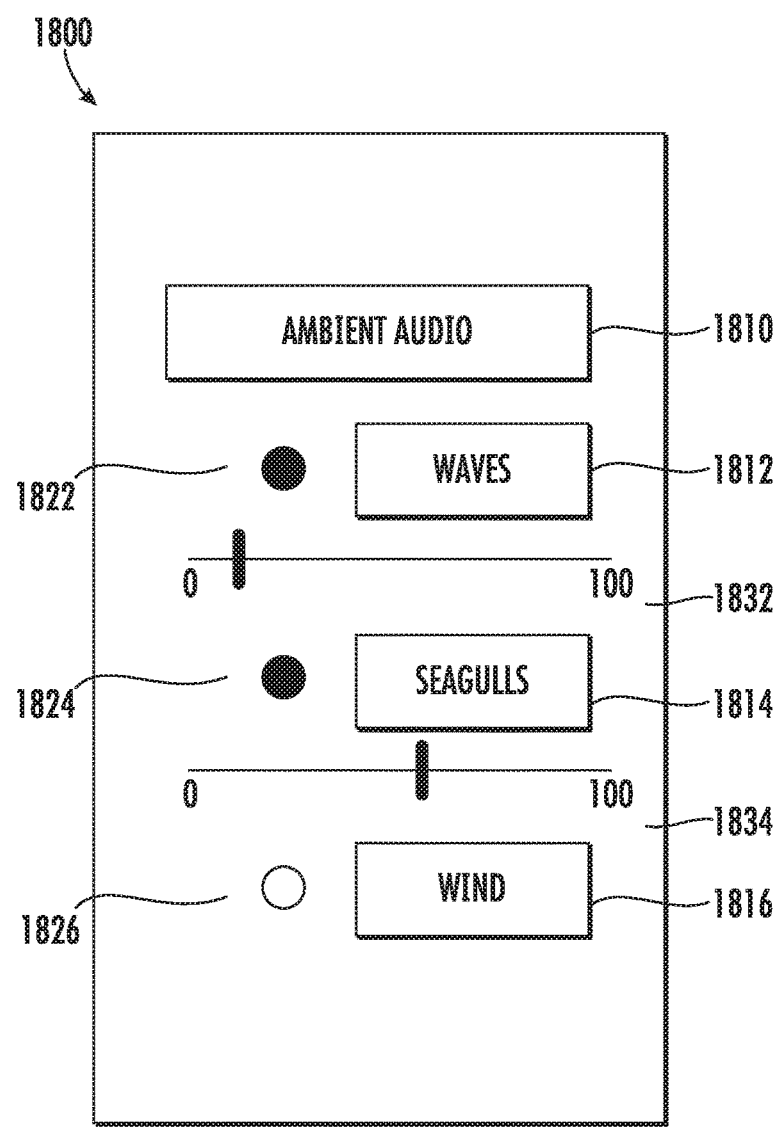
FIG. 18 depicts an example user interface to obtain user input according to example aspects of the present disclosure.

FIG. 18 depicts an example user interface 1800 for obtaining user input which can be used to generate an ambient soundtrack for an edited video. User interface 1800 depicts just one example user interface for obtaining user input. Other suitable user interfaces can similarly be used. In some implementations, user interface 1800 can be displayed on a personal computing device, such as a smart phone, laptop, or other personal computing device. In some implementations, user input received via a user interface 1800 can be provided to an image capture device, such as a mobile image capture device, and an edited video can be generated based at least in part on the user input received via of the user interface 1800.

User interface 1800 can be used, for example, to obtain audio selection input from a user. For example, in some implementations, an image capture device can be used to analyze an audio signal, and label various portions of the audio signal with audio classifier labels descriptive of respective ambient sounds, as disclosed herein. In some implementations, the image capture device can communicate data indicative of the one or more audio classifier labels to a user computing device. The one or more audio classifier labels can then be displayed to a user via the user interface 1800.

For example, one or more audio classifier labels can be displayed in an ambient audio input 1810 option interface. For example, the first audio classifier label "WAVES" 1812, a second audio classifier label "SEAGULLS" 1814, and a third audio classifier label "WIND" 1816 can be displayed. Each audio classifier label 1812, 1814, and 1816 can correspond to one or more audio portions labeled with the corresponding audio classifier label. In some implementations, a user can select a radio button 1822, 1824, or 1826 associated with each audio classifier label 1812, 1814, and 1816, respectively, to select various types of audio to include in an ambient soundtrack. Similarly, checkboxes or other input options can be used in a user interface 1800. For example, as depicted, the first audio classifier label "WAVES" 1812 and the second audio classifier label "SEAGULLS" 1814 have been selected, while the third audio classifier label "WIND" 1816 has not.

In some implementations, slider bars 1832 and 1834 can be included in user interface 1800 when corresponding audio classifier labels 1812 and 1814 have been selected. The slider bars 1832 and 1834 can be used, for example, to determine how much of each type of audio to include in the ambient soundtrack. In some implementations as shown in FIG. 18 the relative audio amount can be depicted as a percentage (e.g., 0% on one end of the slider bar and 100% on the opposite end of the slider bar). In other implementations, the slider bars can represent various ratios to be used to generate the ambient soundtrack. Other audio amount input options can similarly be used in a user interface 1800.

In some implementations, once a user has made his or her audio selections, audio selection inputs descriptive of one or more audio classifier labels can be used to generate the ambient soundtrack. For example, an audio selection input descriptive of the first audio classifier label "WAVES" 1812 and the second audio classifier label "SEAGULLS" can be used to generate the ambient soundtrack. For example, one or more audio portions of the audio signal that have been labeled with corresponding audio classifier labels can be selected for inclusion in the ambient soundtrack.

In some implementations, an audio selection inputs descriptive of a first audio classifier labels can be communicated, such as via a network, to an image capture device, and the image capture device can generate the ambient soundtrack by selecting at least one portion of the audio signal that has the first audio classifier label for inclusion in the ambient soundtrack. In this way, an audio selection input descriptive of one or more audio classifier labels can be received and an ambient soundtrack can be generated by including audio portions that have been labelled with the audio classifier label in the ambient soundtrack.

In some implementations, once the ambient soundtrack has been generated, the ambient soundtrack can be stored and or maintained in a non-volatile memory, and the audio signal can be discarded. Additionally, once an edited video has been generated, the image capture device can transfer the edited video to a user computing device. An advantage provided by such a framework is that bystander privacy can be maintained, since only portions of an audio signal which include background and/or ambient sounds can be saved and/or transferred from an image capture device.

Figure 19:
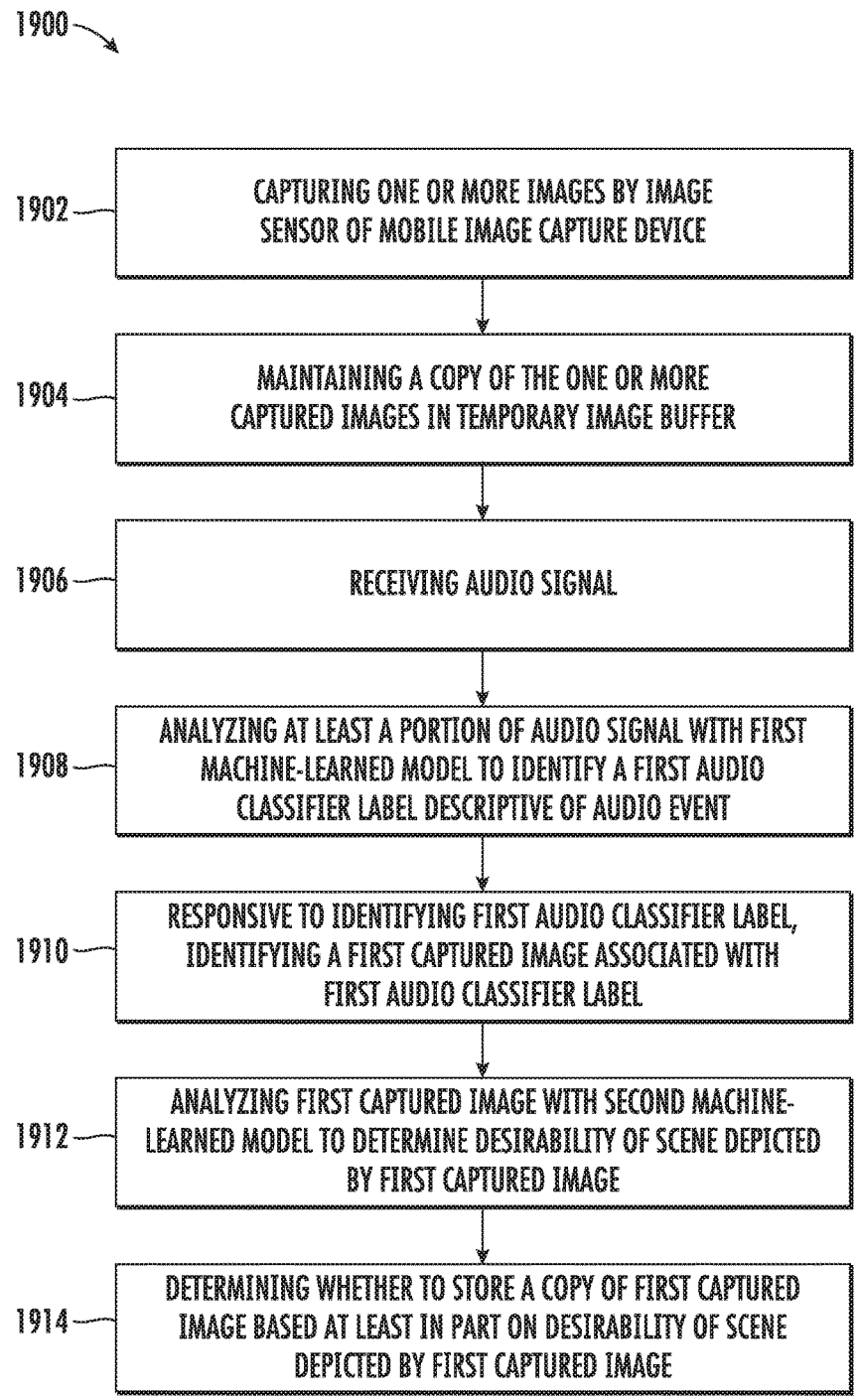
FIG. 19 depicts an example method to curate images captured at a mobile image capture device according to example aspects of the present disclosure.

FIG. 19 depicts a flow diagram of an example method (1900) to curate images captured at a mobile image capture device according to example aspects of the present disclosure. Method (1900) can be implemented by a mobile image capture device, such as a mobile image capture device depicted in FIG. 1. In addition, FIG. 19 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (1902), the method (1900) can include capturing one or more images by an image sensor of a mobile image capture device. For example, a mobile image capture device can be configured to capture images in various modes, such as low resolution, high resolution, burst capture, video capture, or other capture modes, as described herein.

At (1904), the method (1900) can include maintaining a copy of the one or more captured images in a temporary image buffer. For example, an image capture device can include a memory, which can include a temporary image buffer. In some implementations, a copy of one or more captured images can be maintained in the temporary image buffer.

At (1906), the method (1900) can include receiving an audio signal. For example, an image capture device can include an audio sensor, such as a microphone, which can be configured to obtain an audio signal. In some implementations, the audio signal can be temporarily maintained in an audio buffer.

At (1908), the method (1900) can include analyzing at least a portion of the audio signal with a first machine-learned model to identify a first audio classifier label descriptive of an audio event. For example, in various implementations, the machine-learned model can be configured to classify various speech and/or non-speech sounds, such as laughter, crying, image capture cues, or other sounds as disclosed herein.

At (1910) responsive to identifying the first audio classifier label, the method (1900) can include identifying a first captured image associated with the first audio classifier label. For example, in some implementations, the first captured image can be temporally displaced from the audio event. For example, the image capture device can be operable to identify the first image based on a time displacement associated with the first audio classifier label.

For example, for laughter, the time displacement can be a time period preceding the audio event, and one or more images captured prior to the laughter occurring can be identified. For an image capture cue, the time displacement can be a time period following the audio event, and one or more images captured following the audio event can be identified. In some implementations, an image captured concurrently with the audio event can be identified. In this way, one or more images associated with an audio classifier label can be identified.

At (1912), the method can include analyzing the first captured image with a second machine-learned model to determine a desirability of a scene depicted by the first captured image. For example, in some implementations, a face detection neural network can analyze the first captured image to detect a presence of one or more faces in the scene of the first captured image. In some implementations, a face recognition neural network can analyze the first captured image to match one or more faces in the scene of the first captured image to one or more other faces. In some implementations, a face attributes neural network can analyze the first captured image to detect various facial characteristics of one or more faces in the scene depicted by the first captured image. In some implementations, an image content neural network can output one or more semantic labels that describe the scene of the first captured image. In some implementations, a photo quality neural network can output a photo score that describes various photographic quality characteristics of the first captured image.

At (1914), the method (1900) can include determining, based at least in part on the desirability of the scene depicted by the first image, whether to store a copy of the first image associated with the first audio classifier label in a non-volatile memory of the mobile image capture device or to discard the first captured image without storing a copy of the first image. For example, in some implementations, an image associated with a laughter classifier label which does not include a human face can be discarded.

Figure 20:
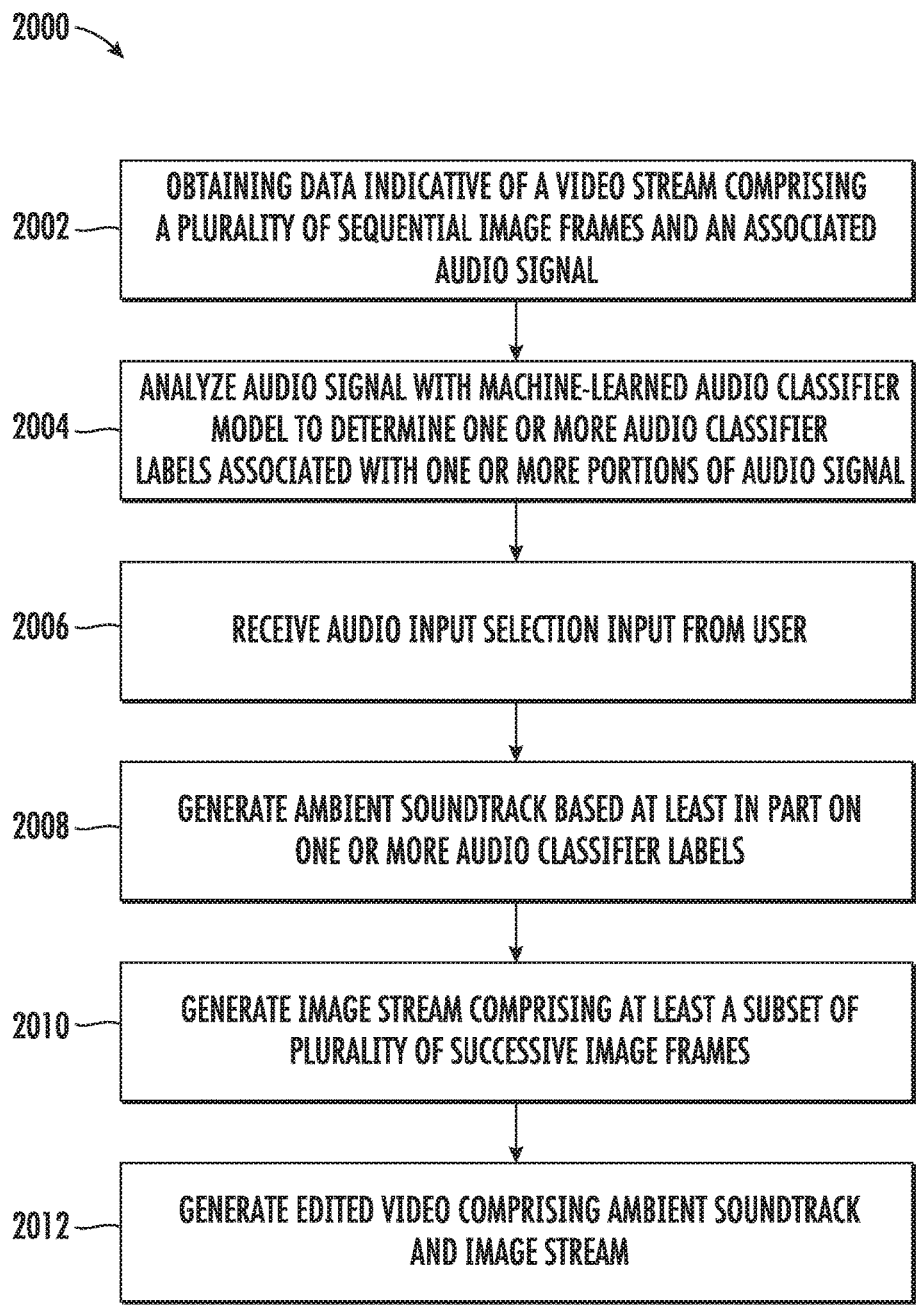
FIG. 20 depicts an example method to generate an edited video including an ambient soundtrack according to example aspects of the present disclosure.

FIG. 20 depicts a flow diagram of an example method (2000) to generate an edited video including an ambient soundtrack according to example aspects of the present disclosure. Method (2000) can be implemented by one or more computing devices, such as one or more mobile image capture device and/or one or more personal computing devices. In addition, FIG. 20 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (2002), the method (2000) can include obtaining data indicative of a video stream comprising a plurality of sequential image frames and an associated audio signal. In some implementations, the data indicative of a video stream can be obtained via a mobile image capture device.

At (2004), the method (2000) can include analyzing the audio signal with a machine-learned audio classifier model to determine a plurality of audio classifier labels associated with a plurality of portions of the audio signal. For example, various portions of the audio signal can be labeled with respective audio classifier labels descriptive of one or more sounds, such as speech or non-speech sounds, identified in the respective portions.

At (2006), the method (2000) can include receiving an audio selection input descriptive of an audio classifier label from a user. For example, in some implementations, a user interface can be displayed on a personal computing device, which can include one or more audio classifier labels corresponding to one or more audio portions of the audio signal.

At (2008), the method (2000) can include generating an ambient soundtrack comprising at least a first portion of the audio signal based at least in part on the plurality of audio classifier labels. For example, portions of the audio signal that have audio classifier labels associated with ambient sound can be selected for inclusion in the ambient soundtrack, while portions of the audio signal that have audio classifier labels associated with foreground sound can be rejected. For example, the audio classifier labels associated with foreground sound can include audio classifier labels associated with human speech. In some implementations, generating the ambient soundtrack can include selecting at least one portion of the audio signal that has an audio classifier label selected by a user in the ambient soundtrack. In some implementations, one or more image frames in the plurality of sequential image frames can be analyzed with one or more image analysis machine-learned models to determine one or more image labels descriptive of the scene depicted by the image frames, and the ambient soundtrack can be generated based at least in part on the one or more image labels.

At (2010), the method (2000) can include generating an image stream comprising at least a subset of the plurality of successive image frames. For example, in some implementations, a first subset of sequential image frames can be selected, a second subset of sequential image frames can be selected, and the image stream can be a shortened image stream comprising the first subset of sequential image frames and the second subset of sequential image frames arranged consecutively. In some implementations, the image stream can be a hyper-lapse image stream generated by selecting a plurality of non-sequential image frames, and arranging the plurality of non-sequential image frames consecutively. In some implementations, the image stream can be a plurality of sequential image frames captured in a hyper-lapse mode.

At (2012), the method (2000) can include generating an edited video comprising the ambient soundtrack and the image stream. For example, the image stream and the ambient soundtrack can be combined in a single file format to be played concurrently.

In some implementations, the method (2000) can further include transferring the edited video to a personal computing device and/or providing the edited video for display, such as via a personal computing device.

Figure 21:
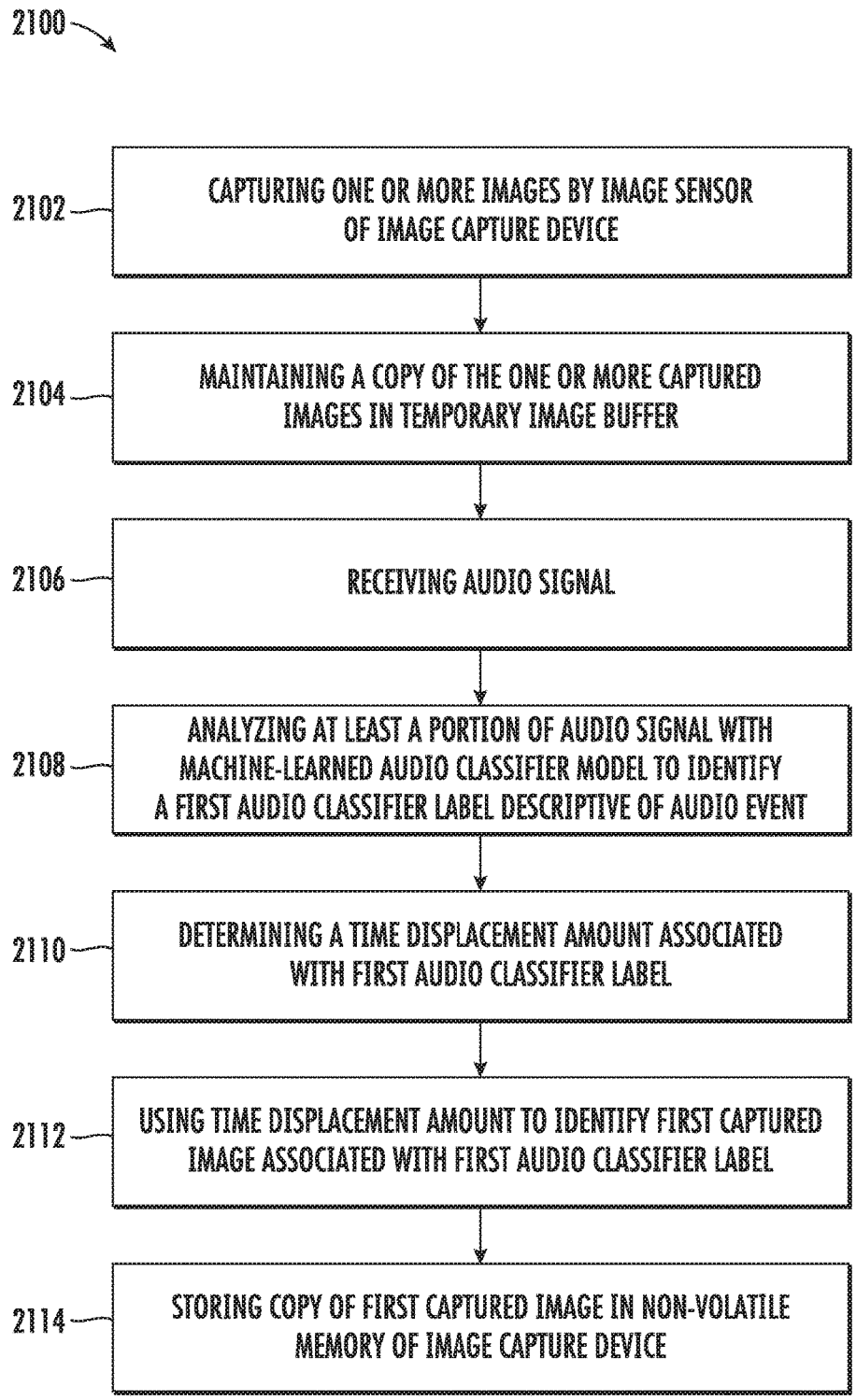
FIG. 21 depicts an example method to store images captured by an image capture device according to example aspects of the present disclosure.

FIG. 21 depicts a flow diagram of an example method (2100) to store images captured by an image capture device according to example aspects of the present disclosure. Method (2100) can be implemented by an image capture device, such as a mobile image capture device depicted in FIG. 1 or other image capture device. In addition, FIG. 21 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (2102), the method (2100) can include capturing one or more images by an image sensor of an image capture device. For example, an image capture device can be configured to capture images in various modes, such as low resolution, high resolution, burst capture, video capture, or other capture modes, as described herein.

At (2104), the method (2100) can include maintaining a copy of the one or more captured images in a temporary image buffer. For example, an image capture device can include a memory, which can include a temporary image buffer. In some implementations, a copy of one or more captured images can be maintained in the temporary image buffer.

At (2106), the method (2100) can include receiving an audio signal. For example, an image capture device can include an audio sensor, such as a microphone, which can be configured to obtain an audio signal. In some implementations, the audio signal can be temporarily maintained in an audio buffer.

At (2108), the method (2100) can include analyzing at least a portion of the audio signal with a machine-learned audio classifier model to identify a first audio classifier label descriptive of an audio event. For example, in various implementations, the machine-learned model can be configured to classify various speech and/or non-speech sounds, such as laughter, crying, image capture cues, or other sounds as disclosed herein.

At (2110) responsive to identifying the first audio classifier label, the method (2100) can include identifying a time displacement amount associated with the first audio classifier model. For example, for laughter, the time displacement amount can be a negative amount of time. For an image capture cue, the time displacement can be a positive amount of time.

At (2112), the method (2100) can include using the time displacement amount to identify a first captured image associated with the first audio classifier label from the one or more captured images maintained in the temporary image buffer. For example, the first captured image can be temporally displaced from the portion of audio signal labeled with the first audio classifier label by the time displacement amount. For example, for laughter, the image capture device can identify a first captured image that was captured by the image capture device at a time prior to receipt of the portion of the audio signal labeled with the laughter label.

At (2114), the method (2100) can include storing a copy of the first image in a non-volatile memory of the image capture device.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

Further, although the present disclosure is generally discussed with reference to mobile image capture devices, the present disclosure is also applicable to other forms of image capture devices, as well, including, for example, surveillance cameras, security systems, dashboard cameras, robotic control system cameras, or other image capture devices. Further, aspects of the present disclosure, such as the curation and editing portions, can be applied to audiovisual content captured from any other camera at any time.

What is claimed is:

1. A mobile image capture device, comprising:
   a network interface;
   a power source;
   an image sensor;
   an audio sensor;
   at least one processor; and
   a memory that stores a plurality of machine-learned models, the plurality of machine-learned models comprising a first machine-learned model configured to determine an audio classifier label and a second machine-learned model configured to determine a desirability of a scene depicted by an image, the memory comprising at least a temporary image buffer, an audio buffer, and a non-volatile memory;
   wherein the mobile image capture device is operable to:
   receive an audio signal;
   analyze at least a portion of the audio signal with the first machine-learned model to determine a first audio classifier label descriptive of an audio event;
   responsive to determining the first audio classifier label descriptive of the audio event, identify a first image associated with the first audio classifier label descriptive of the audio event;
   analyze the first image with the second machine-learned model to determine a desirability of a scene depicted by the first image; and
   determine, based at least in part on the desirability of the scene depicted by the first image, whether to store a copy of the first image associated with the first audio classifier label in the non-volatile memory of the mobile image capture device or to discard the first image without storing a copy of the first image;
   wherein the first image comprises an image captured by the mobile image capture device.

2. The mobile image capture device of claim 1, wherein the first image is temporally displaced from the audio event, and wherein to identify the first image, the mobile image capture device is operable to identify the first image based on a time displacement associated with the first audio classifier label.

3. The mobile image capture device of claim 2, wherein the time displacement comprises a time period preceding the audio event.

4. The mobile image capture device of claim 3, wherein the first audio classifier label comprises laughter.

5. The mobile image capture device of claim 2, wherein the time displacement comprises a time period following the audio event.

6. The mobile image capture device of claim 5, wherein the first audio classifier label comprises an image capture cue.

7. The mobile image capture device of claim 1, wherein the first image associated with the audio label comprises an image captured concurrently with the audio event.

8. The mobile image capture device of claim 1, wherein the second machine-learned model comprises one or more of:
   a face detection neural network that detects a presence of one or more faces in the scene of each image;
   a face recognition neural network that matches one or more faces in the scene of each image to one or more other faces;
   a face attributes neural network that detects various facial characteristics of one or more faces in the scene of each image;
   an image content neural network that outputs one or more semantic labels that describe the scene of each image; and
   a photo quality neural network that outputs a photo score that describes various photographic quality characteristics of each input image.

9. The mobile image capture device of claim 1, wherein the mobile image capture device is further operable to:
   capture a plurality of images;
   maintain a copy of each captured image in the plurality of images in the temporary image buffer; and
   wherein the first image associated with the audio classifier label comprises one of the captured images in the plurality of images.

10. The mobile image capture device of claim 1, wherein to analyze the audio signal with the first machine-learned model to determine the first audio classifier label, the mobile image capture device is operable to:
    maintain a copy of the audio signal in the audio buffer;
    input at least a portion of the copy of the audio signal into the first machine-learned model; and
    receive the first audio classifier label descriptive of an audio event as an output of the first machine-learned model.

11. A method to generate an edited video including an ambient soundtrack, comprising:

obtaining, by one or more computing devices, data indicative of a video stream comprising a plurality of sequential image frames and an associated audio signal;

analyzing, by the one or more computing devices, the audio signal with a machine-learned audio classifier model to determine a plurality of audio classifier labels associated with a plurality of portions of the audio signal;

generating, by the one or more computing devices, an ambient soundtrack comprising at least a first portion of the audio signal based at least in part on the plurality of audio classifier labels, wherein generating the ambient soundtrack based at least in part on the plurality of audio classifier labels comprises selecting for inclusion in the ambient soundtrack portions of the audio signal that have audio classifier labels associated with ambient sound while rejecting portions of the audio signal that have audio classifier labels associated with foreground sound;

generating, by the one or more computing devices, an image stream comprising at least a subset of the plurality of sequential image frames; and generating, by the one or more computing devices, an edited video comprising the ambient soundtrack and the image stream.

12. The method of claim 11, wherein the data indicative of the video stream is obtained via a mobile image capture device.

13. The method of claim 11, wherein the one or more computing devices consist of a mobile image capture device, such that the method is performed by the mobile image captured device.

14. The method of claim 11, further comprising:
receiving, by the one or more computing devices, an audio selection input descriptive of a first audio classifier label from a user; and
wherein generating, by the one or more computing devices, the ambient soundtrack comprises selecting, by the one or more computing devices, at least one portion of the audio signal labeled with the first audio classifier label for inclusion in the ambient soundtrack.

15. The method of claim 11, wherein the audio classifier labels associated with foreground sound comprise audio classifier labels associated with human speech.

16. The method of claim 11, further comprising:
analyzing, by the one or more computing devices, at least a portion of the plurality of sequential image frames with one or more image analysis machine-learned models to determine one or more image labels descriptive of a scene; and
wherein the ambient soundtrack is further generated based at least in part on the one or more image labels.

17. The method of claim 11, wherein generating, by the one or more computing devices, the image stream comprising at least a subset of the plurality of sequential images comprises:
selecting, by the one or more computing devices, a plurality of non-sequential image frames; and
wherein the image stream comprises a hyper-lapse image stream comprising the plurality of non-sequential image frames arranged consecutively.

18. The method of claim 11, wherein generating, by the one or more computing devices, the image stream comprising at least a subset of the plurality of sequential images comprises:
selecting, by the one or more computing devices, a first subset of sequential image frames;
selecting, by the one or more computing devices, a second subset of sequential image frames; and
wherein the image stream comprises a shortened image stream comprising the first subset of sequential image frames and the second subset of sequential image frames arranged consecutively.

19. A method for capturing an image, comprising:
capturing, by an image sensor of an image capture device, one or more images;
maintaining, by the image capture device, a copy of the one or more captured images in a temporary image buffer of the image capture device;
receiving, by the image capture device, an audio signal;
analyzing, by the image capture device, at least a portion of the audio signal with a machine-learned audio classifier model to determine a first audio classifier label descriptive of an audio event;
responsive to determining the first audio classifier label, determining, by the image capture device, a time displacement amount associated with the first audio classifier label;
using, by the image capture device, the time displacement amount to identify a first captured image associated with the first audio classifier label from the one or more captured images maintained in the temporary image buffer, wherein the first captured image is temporally displaced from the portion of the audio signal labeled with the first audio classifier label by the time displacement amount; and
storing, by the image capture device, a copy of the first captured image in a non-volatile memory of the image capture device.

20. The method of claim 19, wherein the first audio classifier label comprises a laughter label and the time displacement amount comprises a negative amount of time, such that the image capture device identifies the first captured image that was captured by the image capture device at a time prior to receipt of the portion of the audio signal labeled with the laughter label.

* * * * *